(12) United States Patent
Allen

(10) Patent No.: US 10,946,923 B2
(45) Date of Patent: Mar. 16, 2021

(54) PERSONAL TRANSPORT VEHICLE

(71) Applicant: NantMobility, LLC, Culver City, CA (US)

(72) Inventor: Nathan Howard Allen, Pasadena, CA (US)

(73) Assignee: NantMobility, LLC, Culver City, CA (US)

(*) Notice: Subject to any disclaimer, the term of this patent is extended or adjusted under 35 U.S.C. 154(b) by 0 days.

(21) Appl. No.: 16/441,706

(22) Filed: Jun. 14, 2019

(65) Prior Publication Data
US 2019/0382072 A1    Dec. 19, 2019

Related U.S. Application Data

(60) Provisional application No. 62/685,829, filed on Jun. 15, 2018.

(51) Int. Cl.
*B62K 11/02* (2006.01)
*B62K 15/00* (2006.01)
*B62M 7/12* (2006.01)

(52) U.S. Cl.
CPC .............. *B62K 11/02* (2013.01); *B62K 15/00* (2013.01); *B62M 7/12* (2013.01); *B62K 2202/00* (2013.01)

(58) Field of Classification Search
CPC ........ B62K 11/00; B62K 21/12; B62K 21/18; B62K 23/06; B62K 15/006; B62K 2202/00; B62J 45/00; B62L 1/02; B62H 5/00; B62M 6/60
See application file for complete search history.

(56) References Cited

U.S. PATENT DOCUMENTS

| | | | | | |
|---|---|---|---|---|---|
| 2,083,188 | A | * | 6/1937 | Baldwin | A63C 17/22 301/5.7 |
| 3,897,842 | A | * | 8/1975 | Rheaume | B62D 37/04 180/219 |
| 3,948,563 | A | * | 4/1976 | Replin | B60B 1/02 301/5.1 |
| 4,007,614 | A | * | 2/1977 | Schott | B62H 5/003 70/234 |
| 4,379,393 | A | * | 4/1983 | Schott | B62H 5/003 70/234 |
| 4,508,392 | A | * | 4/1985 | LeBlond | B60B 27/04 301/110.5 |
| 4,522,281 | A | * | 6/1985 | Snider | B62K 5/01 180/208 |
| 5,265,695 | A | * | 11/1993 | Piazzi | B62K 3/002 180/208 |
| 6,505,846 | B1 | * | 1/2003 | Hoffman | B62H 5/003 280/274 |

(Continued)

*Primary Examiner* — Drew J Brown
(74) *Attorney, Agent, or Firm* — Harness, Dickey & Pierce, P.L.C.

(57) ABSTRACT

A personal transport vehicle is provided capable of staying upright without the need for a stand by incorporating tires having an advantageous design combined with an overall lowered center of gravity. The personal transport vehicle further incorporates a hub and steering assembly configured within the front wheel of the vehicle, as well as a bake and propulsion means configured within the rear wheel of the vehicle. Finally, the personal transport vehicle is capable of being folded into a compact configuration, lending itself to ease of shipment, storage and transport.

15 Claims, 24 Drawing Sheets

(56) References Cited

U.S. PATENT DOCUMENTS

| | | | |
|---|---|---|---|
| 8,776,932 B1* | 7/2014 | Bussinger | B62K 15/006 |
| | | | 180/208 |
| 9,051,019 B2* | 6/2015 | Reck | B62K 7/04 |
| 9,440,698 B2* | 9/2016 | Dadoosh | H02J 7/0042 |
| D774,961 S | 12/2016 | Allen | |
| 9,873,476 B2* | 1/2018 | Etzelsberger | B62J 1/04 |
| 2003/0102647 A1* | 6/2003 | Morrone | B62H 5/142 |
| | | | 280/281.1 |
| 2005/0269793 A1* | 12/2005 | Mackin | B62J 1/00 |
| | | | 280/87.041 |
| 2006/0266570 A1* | 11/2006 | Roth | B62K 3/002 |
| | | | 180/208 |
| 2009/0020350 A1* | 1/2009 | Wu | B62K 15/008 |
| | | | 180/208 |
| 2011/0298193 A1* | 12/2011 | Fan | B62K 15/006 |
| | | | 280/221 |
| 2012/0193159 A1* | 8/2012 | Wu | B62K 5/007 |
| | | | 180/208 |
| 2014/0203538 A1* | 7/2014 | Huang | B62K 3/00 |
| | | | 280/639 |
| 2015/0068828 A1* | 3/2015 | Delgatty | B62J 7/04 |
| | | | 180/210 |
| 2017/0001683 A1* | 1/2017 | Gerencser | B62K 3/002 |
| 2018/0015978 A1* | 1/2018 | Delgatty | B62K 11/02 |
| 2018/0022411 A1* | 1/2018 | Kistemaker | B62K 21/00 |
| | | | 180/208 |

\* cited by examiner

PERSONAL TRANSPORT VEHICLE

CROSS-REFERENCE TO RELATED APPLICATION

This application claims the benefit of and priority to U.S. Provisional Application No. 62/685,829, filed on Jun. 15, 2018. The entire disclosure of the above application is incorporated herein by reference.

FIELD

The present disclosure generally relates to personal transport vehicles.

BACKGROUND

This section provides background information related to the present disclosure which is not necessarily prior art.

The desire for new and innovative forms of transportation is an ongoing pursuit of modern man. Some of the challenges of designing vehicles revolve around high energy-efficiency and practicality, while maintaining good usability and utility. Aesthetic design and user fun factor is also a part of the equation and sometimes offsets utility and/or performance in the vehicle. However atop the list is the marriage of design, function and innovation, the hallmarks of the present disclosure.

The advent and focus on mass-transit and automobiles have largely outpaced innovations for personalized vehicles, thereby creating an innovation void in this space. Whatever innovation has spawned, has been directed towards vehicles like the Segway® and similar variants. In addition, the current direction of development for two-wheeled vehicles has placed emphasis on additional functionality and multi-tasking, rather than simplicity and efficiency.

Accordingly, while innovations and advancements exist for two-wheeled vehicles, challenges remain. The present disclosure addresses and overcomes various of these challenges.

SUMMARY

This section provides a general summary of the disclosure, and is not a comprehensive disclosure of its full scope or all of its features.

The present disclosure relates generally to a personal transport vehicle for use in urban and localized districts. In particular, the present disclosure relates to a self-balancing, personal transport vehicle that, in some embodiments, is capable of staying upright without the need for a stand or other device traditionally utilized to support the vehicle when it is stationary. In connection therewith, the vehicle includes at least one wheel (e.g., one wheel, two wheels (generally aligned laterally, generally inline, etc.), three wheels, etc.) configured to help facilitate such self-balancing.

In a first aspect of the present disclosure, a personal transport vehicle is provided having a frame, a front wheel and hub in-line with a rear wheel and hub, and a steering assembly contained within a portion of the front wheel and hub. In some instances, placement of the steering assembly within the front wheel and hub provides protection to a component of the steering assembly. In some instances, placement of the steering assembly within the front wheel and hub provides ease of disassembly and transport of the vehicle. In some instances, all components of the steering assembly are placed within the front wheel and hub, wherein the entire steering assembly is concealed from view, thereby providing an elegant appearance for the vehicle.

In some instances, the steering assembly comprises a spindle rotatably attached to the frame, and a steering arm affixed to the spindle, wherein the spindle is configured to rotate in a vertical, or near-vertical axis relative to a horizontal axis of the frame (such as the horizontal axis of a standing platform of the vehicle).

In some instances, the front and rear hubs of the vehicle are coupled to the frame via front and rear axles, wherein said front and rear axles each comprise an attached end coupled to the frame, a free end extending outwardly from the frame, and a body extending therebetween, wherein the front and rear hubs are supported by the body and positioned between the attached and free ends of the respective axles. Thus, in some instances only the attached ends of the front and rear axles are coupled to the frame of the vehicle, wherein the free ends of the front and rear axles are free from any structural support. In some instances, the attached ends of the front and rear axles are coupled to a same side of the frame. In some instances, the attached ends of the front and rear axles are coupled to opposite sides of the frame. In some instances, a steering assembly of the vehicle is attached to a first side of the frame, and the attached ends of the front and rear axles are attached to a second side of the frame, wherein the second side of the frame is opposite the first side of the frame. In some instances, a steering assembly and the attached ends of the front and rear axles of the vehicle are all attached to a same side of the frame of the vehicle. In some instances, a steering assembly is attached to a first side of a frame of the vehicle, an attached end of a first axle is attached to a second side of the frame that is opposite the first side of the frame, and an attached end of a second axle is attached to the first side of the frame, wherein the first and second axles are selected from the group consisting of a front axle and a rear axle of the vehicle.

In a second aspect of the present disclosure, a personal transport vehicle is provided having a lowered center of gravity and at least one tire comprising a large contact surface or patch (e.g., a generally flattened portion extending around a perimeter of the tire, etc.), the combination of which allows the vehicle to self-balance in an upright position (e.g., without use of a separate stand or other structure coupled to the vehicle, etc.). In one embodiment, such a vehicle includes two inline tires. In general in this aspect, the large contact surface of the at least one tire further provides stability and optimized handling of the vehicle while driving. In some instances, a center of gravity (i.e., a lowered center of gravity) for the vehicle is provided between a horizontal plane extending through a centerline of the front and rear hubs, and a surface on which the wheels of the vehicle are supported (i.e., the ground). In some embodiments, where the vehicle includes two inline tires, a width of one or more of the tires is the maximum width of the vehicle. In some embodiments, a width of one or more of the tires is approximately equal to a maximum width of the remaining components and/or surfaces of the vehicle. In some embodiments, a width of one or more of the tires is greater than a maximum width of the remaining components and/or surfaces of the vehicle. In some instances, a lowered center of gravity for the vehicle is positioned substantially below the horizontal plane extending through a centerline of the front and rear hubs.

In a third aspect of the present disclosure, a personal transport vehicle is provided having a brake and a motor contained within the rear hub and wheel of the vehicle. In some instances, the brake comprises a brake disc and a brake caliper. In some instances, the brake further comprises a linkage, cable housing, brake cable, hydraulic line and/or hydraulic fluid, some of which may be positioned external to the rear hub and wheel, and which is configured to permit a user to actuate the brake.

In a fourth aspect of the present disclosure, a personal transport vehicle is provided having at least one foldable joint whereby the vehicle is capable of being folded into a compact configuration for ease in storage and/or transport. In some instances, the vehicle comprises a rear seat rotatably coupled to the frame via a seating arm, which may also be rotated similar to the steering arm, to aid in packaging, storing and transporting the vehicle. For example, in some instances a steering arm of the vehicle is configured to fold inwardly toward a vertical center or centerline of the frame, and into a horizontal position that is parallel to a horizontal standing platform or other surface of the frame, and the seating arm is configured to fold inwardly towards the vertical center of the frame and into a horizontal position that is parallel to the folded position of the steering arm, thereby providing a folded configuration for the vehicle. In some instances, a folded configuration of the vehicle locates all foldable elements of the vehicle within upper and lower horizontal planes defined by a maximum diameter of at least one wheel of the vehicle.

It is to be understood that both the foregoing general description and the following detailed description are exemplary and explanatory and are not restrictive of the present disclosure. That said, further areas of applicability will become apparent from the description provided herein. Again, the description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In connection therewith, example embodiments of the present disclosure will be described and explained with additional specificity and detail through use of the accompanying drawings in which.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure. It will be readily understood that the components of the present disclosure, as generally described and illustrated in the figures herein, could be arranged and designed in a wide variety of different configurations. Thus, the following more detailed description, as represented in the figures, is not intended to limit the scope of the present disclosure, but is merely representative of example embodiments.

Figure 1:
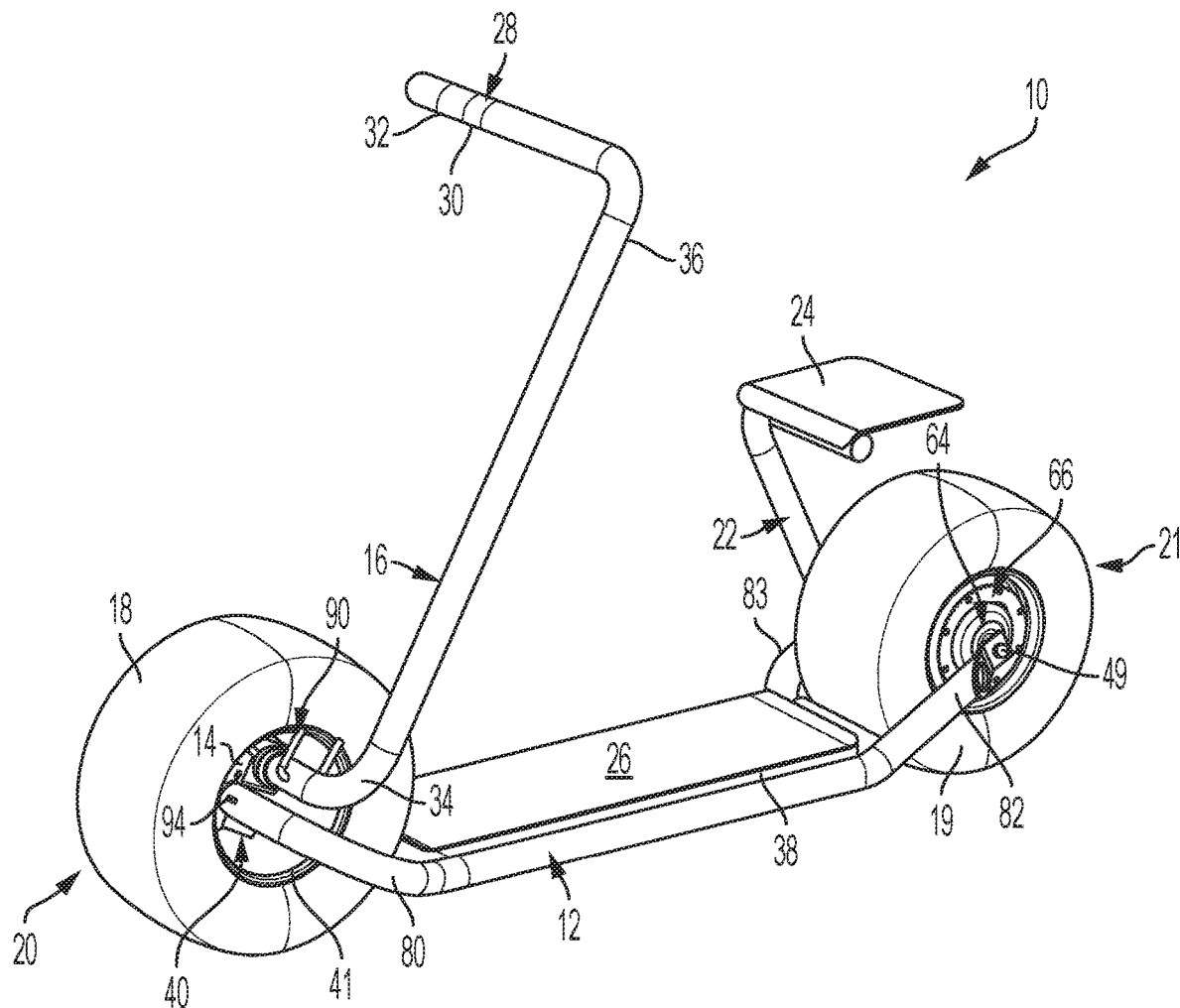
FIG. 1 shows a perspective view of a vehicle in an assembled configuration in accordance with a representative embodiment of the present disclosure.

Referring now to FIG. 1, a personal transport vehicle, or vehicle 10, is shown in an assembled or ready-to-ride configuration. Vehicle 10 generally comprises a frame 12 having a middle portion on which is supported a platform 26 in a relatively-horizontal plane. The frame 12 also comprises a front end 80 and a rear end 82 coupled to front and rear hubs 40 and 64, respectively. Vehicle 10 further comprises a compartment or housing 38 having an internal space for storing various components of the vehicle, such as a power supply (e.g., a battery, etc.), fuel (e.g., a fuel cell, etc.), and circuitry as may be needed. In some instances, the housing 38 further comprises a ballast weight to help facilitate self-balancing of the vehicle 10 (e.g., to account for off-center weighting of the vehicle caused by frame 12, other components, etc. that extend away from a longitudinal center line of the vehicle 10 (extending generally from front tire 18 to rear tire 19); etc.). Vehicle 10 further comprises front and rear tires 18 and 19, which are seated onto the front and rear hubs 40 and 64, respectively, thereby providing front and rear wheel assemblies (or front and rear wheels) 20 and 21, respectively. In some embodiments, the frame 12 of the vehicle 10 may be about thirty inches long, about forty inches long, about fifty inches long, about sixty inches long, about seventy inches long, etc. In some larger embodiments, the frame 12 of the vehicle 10 may be 5 feet, 10 feet, 20 feet, 30 feet, 40 feet, or longer. In some shorter embodiments, the frame 12 of the vehicle 10 may be shorter than 1 inch, 1 inch, 5 inches, 10 inches, 20 inches, etc. Some shorter embodiments may use a single wheel. In some embodiments, the frame 12 of the vehicle 10 may be about ten inches wide, about fifteen inches wide, about twenty inches wide, about thirty inches wide, etc. In some wider embodiments, the frame 12 of the vehicle 10 may be 5 feet, 10 feet, 15 feet, 20 feet or wider. In some narrower embodiments, the frame 12 of the vehicle 10 may be less than 1 inch, 1 inch, 2 inches, or 5 inches wide, etc.

In some embodiments, front and rear tires 18 and 19 comprise a width that defines a maximum width for the vehicle 10. In some embodiments, the maximum width for the vehicle 10 is no more than 10%, 20%, 30%, 40%, or 50% greater than the width of one or more of the front tire 18 or the rear tire 19. In some embodiments, at least one of front and rear tires 18 and 19 comprises a patch or tire width that is approximately equal to a maximum width of all remaining components or surfaces of the vehicle 10. In some embodiments, at least one of front and rear tires 18 and 19 comprises a width that is equal to, approximately equal to, or greater than a width of platform 26. That said, in some embodiments, one or both of the front and rear tires 18 and 19 may have a width of about three inches, or a width of about four inches, or a width of about five inches, etc. Further, in some embodiments, one or both of the front and rear tires 18 and 19 may have a diameter of about twelve inches, a diameter of about fifteen inches, or a diameter of about sixteen inches, or a diameter of about eighteen inches, or a diameter of about twenty inches, or a diameter of about twenty-two inches, etc.

Vehicle 10 further comprises a steering arm 16 comprising a proximal end 34 coupled to front hub 40 and a distal end 36 comprising a handle having controls 28, which may include a throttle lever 30 and a brake lever 32. In some embodiments, vehicle 10 comprises a seating arm 22 having a proximal end 23 (obscured) coupled to rear hub 64, and a distal end 25 comprising a seat 24. Vehicle 10 further comprises a motor, a power source, a braking system having braking components, a steering assembly having steering components, and various other mechanical means necessary to permit a user to use vehicle 10, namely, start, propel, steer, stop, park, and store vehicle 10, as is described in detail below.

In some embodiments, proximal end 34 of steering arm 16 is rotatably coupled to front hub 40 and moveable between a lowered position and a raised position. In some embodiments, a lowered position of steering arm 16 positions steering arm 16 in a horizontal plane that is approximately parallel to a plane of the platform 26. In some embodiments, a raised position of steering arm 16 positions steering arm 16 at an acute angle relative to a generally horizontal plane of platform 26. In some embodiments, proximal end 34 of the steering arm 16 comprises a quick-release locking mechanism 90 that may be actuated to permit rotation of steering arm 16 between the lowered and raised positions. In some embodiments, locking mechanism 90 comprises a plurality of fixed stops between a maximally lowered position and a maximally raised position, wherein the user may actuate locking mechanism 90 to select a desired pre-set acute angle position. In some embodiments, locking mechanism 90 comprises an infinite number of stops between a maximally lowered position and a maximally raised position, wherein the user may actuate locking mechanism 90 to select any desired acute angle.

The frame 12 may comprise any configuration compatible with the teachings of the present disclosure. For example, in some embodiments frame 12 comprises a single, monolithic structure. In some embodiments, frame 12 comprises two or more pieces assembled together into a single frame structure. Frame 12 further comprises a material that is capable of withstanding the strains, stresses and forces required by vehicle 10. Non-limiting examples of materials compatible for use in providing frame 12 include metals, metal alloys (including steel, carbon, aluminum, titanium, etc.), mixed metal alloys, metal composite alloys, composite materials, including fiberglass and carbon fiber materials, plastics, plastic composites, resins, impregnated foam, and combinations thereof and derivatives therefrom. In some embodiments, frame 12 comprises a hollow tubular material. In some embodiments, frame 12 comprises hollow steel tubing.

Various methods for manufacturing the frame 12 may be incorporated, including, but not limited to welding, plastic welding, laser welding, brazing, extruding, CNC, 3D printing, injection molding, flow forming, thermal curing, casting, combinations therefrom, and derivatives thereof.

Variations of frame 12 may allow for attachment of front hub 40 and rear hub 64 in different configurations. For example, in some embodiments front end 80 comprises a single arm or extension that is coupled to spindle 14, wherein spindle 14 is configured to receive and support a single attached end of a front axle (obscured), an opposite end of the front axle (obscured) being solely supported by front rim 41, as shown in FIGS. 1-3 and 5-12. In some embodiments, frame 12 comprises left-side rear end 82 and a right-side rear end 83, wherein left-side and right-side rear ends 82, 83 are configured to receive and support opposite ends of rear axle 49, as shown in FIGS. 1, 2A, 4, and 13. In some embodiments, frame 12 comprises a single rear end 82 coupled to a single attached end of rear axle 49, an opposite end of rear axle 49 being solely supported by rear hub 64, as shown in FIGS. 2B and 3.

Figure 2A:
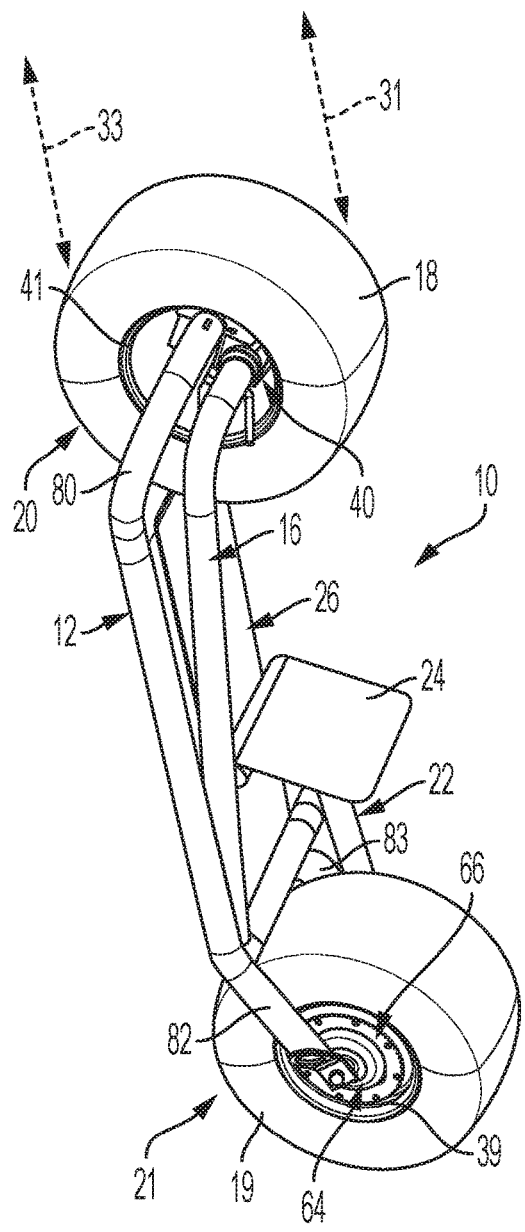
FIGS. 2A and 2B show perspective views of vehicles in folded configurations in accordance with representative embodiments of the present disclosure.
Figure 2B:
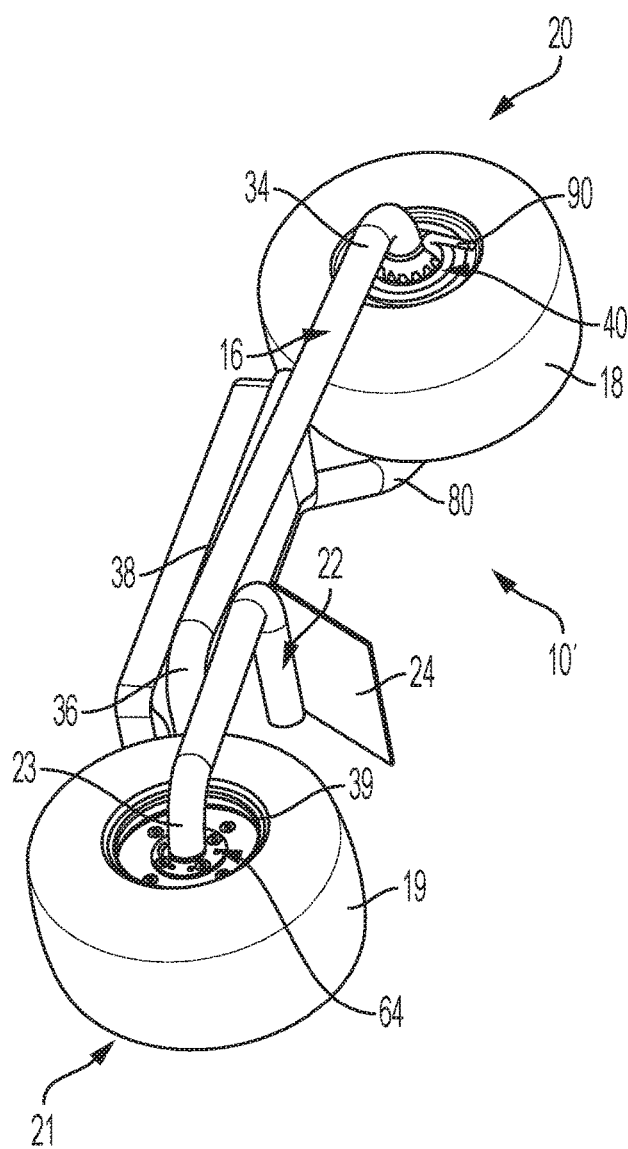
Figure 3:
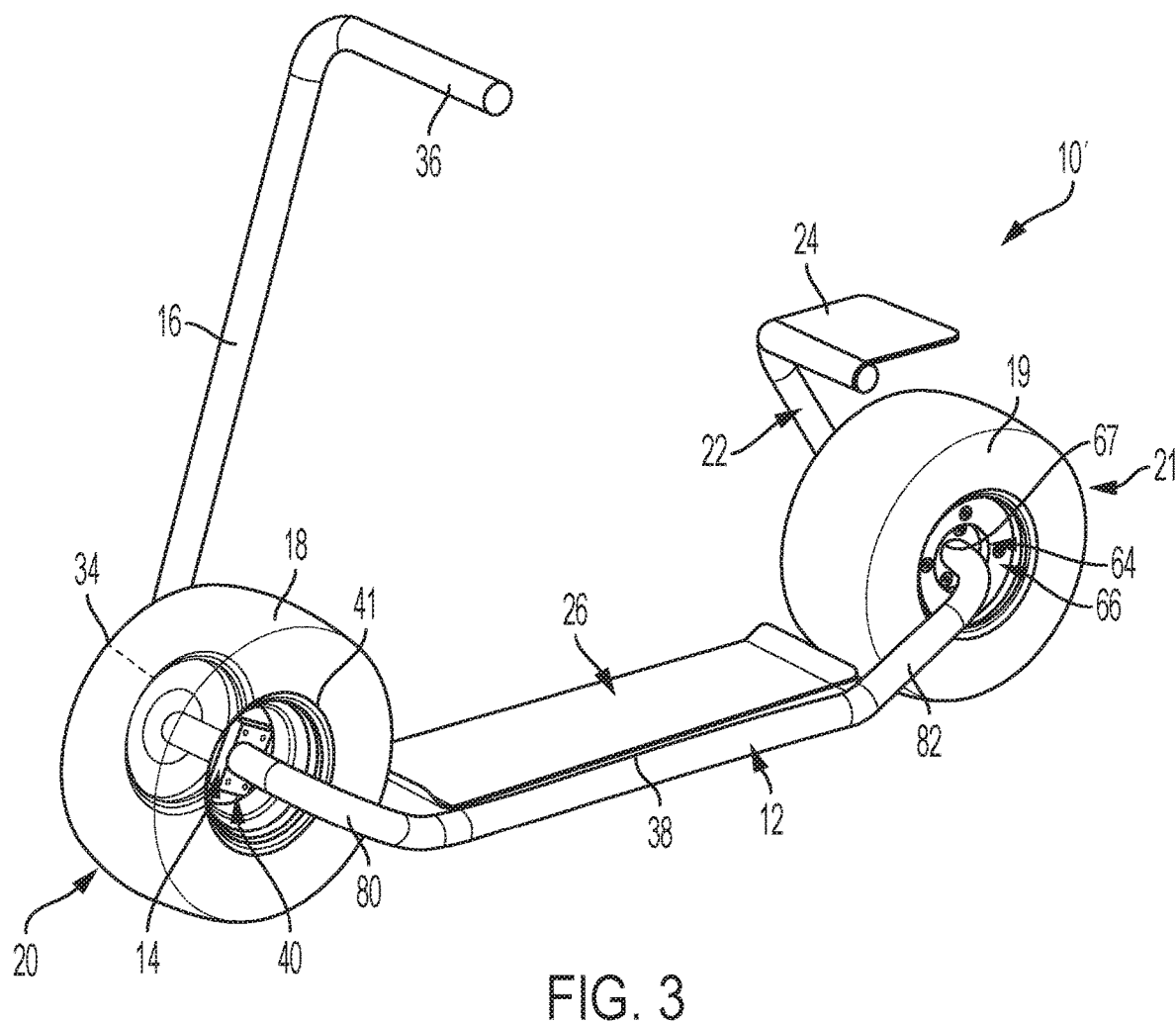
FIG. 3 shows a perspective view of a vehicle in an assembled configuration in accordance with a representative embodiment of the present disclosure.

In some embodiments, front end 80 of frame 12 and proximal end 34 of steering arm 16 both engage the front wheel assembly 20 and front hub 40 assembly on a same side of vehicle 10, as shown in FIGS. 1, 2A and 5-9. In some embodiments, front end 80 of frame 12 and proximal end 34 of steering arm 16 engage front wheel assembly 20 and front hub 40 on opposite sides of vehicle 10', as shown in FIGS. 2B, 3 and 10-12. FIGS. 1, 2A and 13 further demonstrate embodiments where left-side and right-side rear ends 82 and 83 of frame 12 engage opposite sides of rear wheel assembly 21 and rear hub 64 via two attached ends of rear axle 49. In some embodiments, front end 80 comprises one or more stops 94 configured and positioned to limit a range of rotation for front wheel assembly 20 and front hub 40 (e.g., when steering, turning, etc. the front wheel 20). In some embodiments, proximal end 34 of steering arm 16 engages rear hub 64, and steering may be performed with rear hub 64, via steering motors driving the front hub 40, or both. In some embodiments, both front hub 64 and rear hub 40 are steered using one or more steering motors.

In some embodiments, vehicle 10 comprises the compartment or housing 38 coupled to the frame 12 at a position between front and rear wheel assemblies 20 and 21. In some embodiments, housing 38 comprises a portion of frame 12. In some embodiments, housing 38 is an independent component coupled to frame 12. In some embodiments, housing 38 is indirectly coupled to frame 12 via platform 26. In some embodiments, platform 26 comprises a top surface of housing 38. In some embodiments, housing 38 comprises an internal compartment (or multiple internal compartments) for storing or confining various components of vehicle 10, such as, fuel, fuel lines, fuel pump, one or more batteries and/or fuel cells, electrical and electronic circuitry and components relating to the consumption, charging and discharging of electricity, for example, charging equipment and accessories, power converters, electronic speed controls, and computer control modules, spare parts, tools, and the like.

In some embodiments, vehicle 10 further comprises a motor 66 incorporated into rear hub 49. In some embodiments, motor 66 comprises an electric wheel hub motor, wheel motor, wheel hub drive, hub motor or in-wheel motor, as is known in the art. In some embodiments, motor 66 is operably connected to a power source (obscured) stored within housing 38. In some embodiments, a power source of vehicle 10 comprises an electric-vehicle battery, a traction battery, or a deep-cycle battery, which may include one or more batteries or battery types selected from the group consisting of lead-acid, nickel metal hydride, molten salt, alkaline, nickel-cadmium, and lithium-ion. In some embodiments, a battery having a higher mass (as compared to other available options) is selected in order to lower a center of gravity for vehicle 10. In some embodiments, battery 52 (FIG. 4) may be located within the housing 38 in a lateral position (relative to the longitudinal centerline of the vehicle 10) to help facilitate self-balancing of the vehicle 10 (e.g., to account for or help balance off-center weighting associated with the frame 12, steering arm 16, seating arm 22, etc.). In some embodiments, vehicle 10 further comprises electric circuitry, electric leads, electric connectors, and electric switches whereby motor 66 is powered and controlled by a user (e.g., via controls 28, etc.) and/or a processor. In some embodiments, vehicle 10 comprises one or more mechanical controls, levers, cables, fittings, housings, and the like whereby motor 66 is controlled (e.g., by a user and/or a processor, etc.). In some instances, vehicle 10 comprises electric and mechanical components whereby controls 28 are electrically, mechanically, or electrically and mechanically operated by a user and/or a processor. In some embodiments, the controls 28 may include an electric throttle for use in controlling operation of the motor 66, etc. Various embodiments of the present disclosure further comprise options for drive-by-wire.

Referring now to FIG. 2A, vehicle 10 is shown in a folded configuration wherein steering arm 16 and seating arm 22 are folded inwardly towards a vertical center or centerline of frame 12, and into horizontal orientations that are approximately or generally parallel to a horizontal plane of platform 26. In the folded configuration, a perimeter of vehicle 10 is vertically confined within upper and lower horizontal planes 31 and 33, defined by a maximum outer diameter of front and rear tires 18 and 19. Thus, a folded configuration of vehicle 10 provides a compact format for storing and transporting vehicle 10.

In some instances, steering arm 16 and seating arm 22 lay adjacent to, or in close proximity to platform 26 when in a folded configuration. In some embodiments, in the folded configuration, all components of the vehicle are generally contained (e.g., vertically, etc.) between the planes 31 and 33. In some embodiments, proximal end 34 of steering tube 16 and front end 80 of frame 12 are both coupled to front hub 40 on a same side of vehicle 10, while a proximal end of seating arm 22 is coupled to rear hub 64 on an opposite side of vehicle 10. In some instances, a proximal end of seating arm 22 and right-side rear end 83 of the frame 12 are both coupled to rear hub 64 on a right-side of vehicle 10. In some instances, a proximal end of seating arm 22 and left-side rear end 82 of the frame 12 are both coupled to rear hub 64 on a left-side of vehicle 10.

Referring now to FIG. 2B, vehicle 10 is shown in an alternative folded configuration. In some embodiments, proximal end 34 of steering tube 16 is coupled to a first side of front hub 40, and front end 80 of frame is coupled to an opposite side of front hub 40. In some instances, proximal end 34 of steering arm 16 and front end 80 of frame 12 are coupled together via spindle 14 and steering linkage of front hub 40 and front wheel assembly 20, as shown in FIGS. 2B and 3. In some instances, a proximal end of seating arm 22 is coupled to a first side of rear hub 64, and rear end 82 of frame 12 is coupled to an opposite side of rear hub 64.

With continued reference to FIGS. 2B and 3, in some instances a proximal end of seating arm 22 is rotatably coupled to rear end 82 of frame 12 through a central pathway 67 of motor 66 and/or rear hub 64. In some embodiments, motor 66 is rear hub 64. In some instances, a portion of seating arm 22 and/or rear end 82 provides an axle surface or axle component for rear hub 64 and/or motor 66, wherein one or more bearings or bearing surfaces are provided between rear hub 64 and/or motor 66, and the axle surface. In some embodiments, one or more bearings are provided between motor 66 and seating arm 22. In some embodiments, one or more bearings are provided between motor 66 and rear end 82 of frame 12. In some embodiments, one or more bearings are provided between rear hub 64 and seating arm 22 and/or rear end 82. In some embodiments, one or more bearings or bearing surfaces is provided between a proximal end of seating arm 22 and rear end 82 of frame 12.

Figure 4:
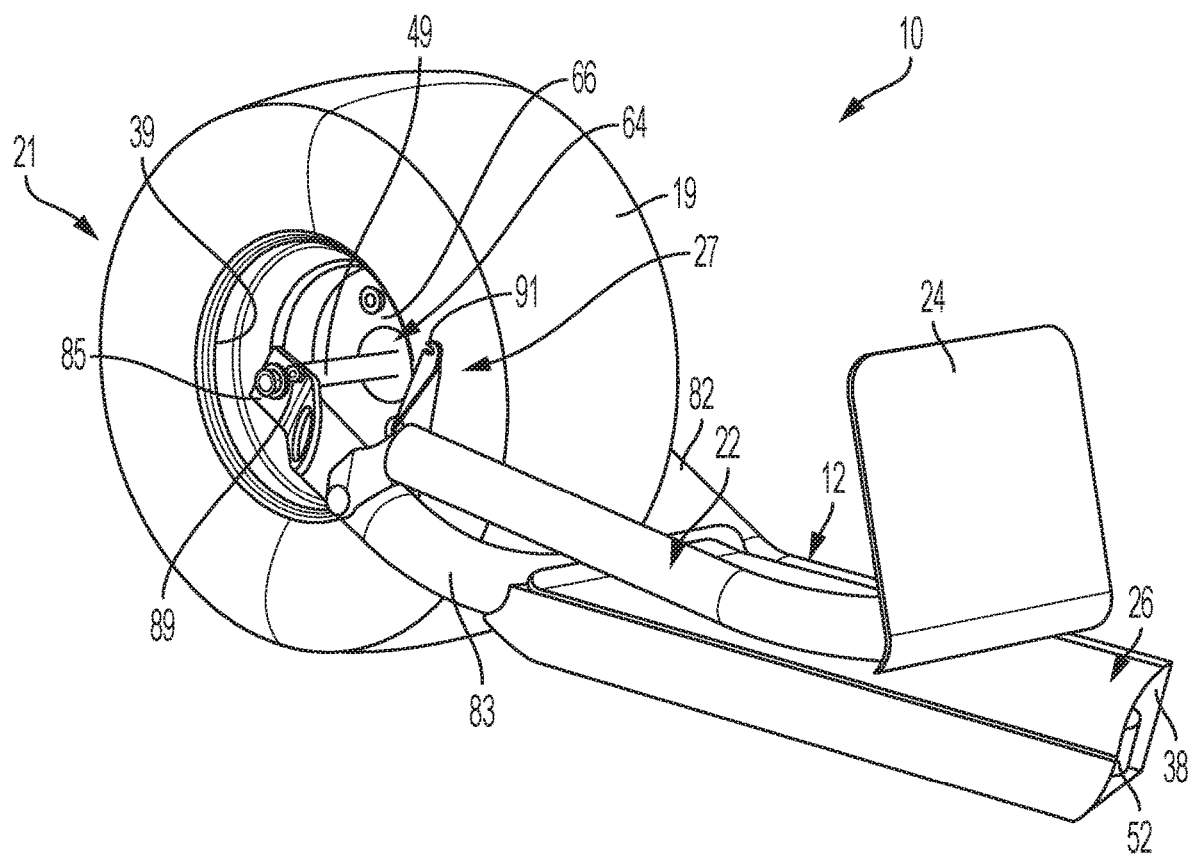
FIG. 4 shows a detailed perspective view of a rear wheel of a vehicle in a folded configuration in accordance with a representative embodiment of the present disclosure.

Referring now to FIG. 4, a perspective view of rear hub 64 and seating arm 22 are shown in a folded configuration (e.g., similar to FIG. 2A). In some embodiments, seating arm 22 is hingedly coupled to right-side rear end 83 of frame 12 at a position proximal to rear hub 64. In some embodiments, a distal end of right-side rear end 83 comprises a mounting bracket or plate 85 to which rear axle 49 is secured. In some instances, plate 85 comprises a stud 89 configured to compatibly receive and selectively retain a notch 91 of seating arm 22. When notch 91 and stud 89 are engaged, seating arm 22 is locked into an upright position. In some embodiments, seating arm 22 and/or frame 12 further comprises a quick-lock or quick-release mechanism 27 configured to permit selective coupling and uncoupling of notch 91 and stud 89. In some embodiments, quick-release mechanism 27 comprises at least one of a cam-lock, a clamp, a pawl, a threaded connection, a friction lock, a fastener, and a biasing element, such as a spring.

Figure 5:
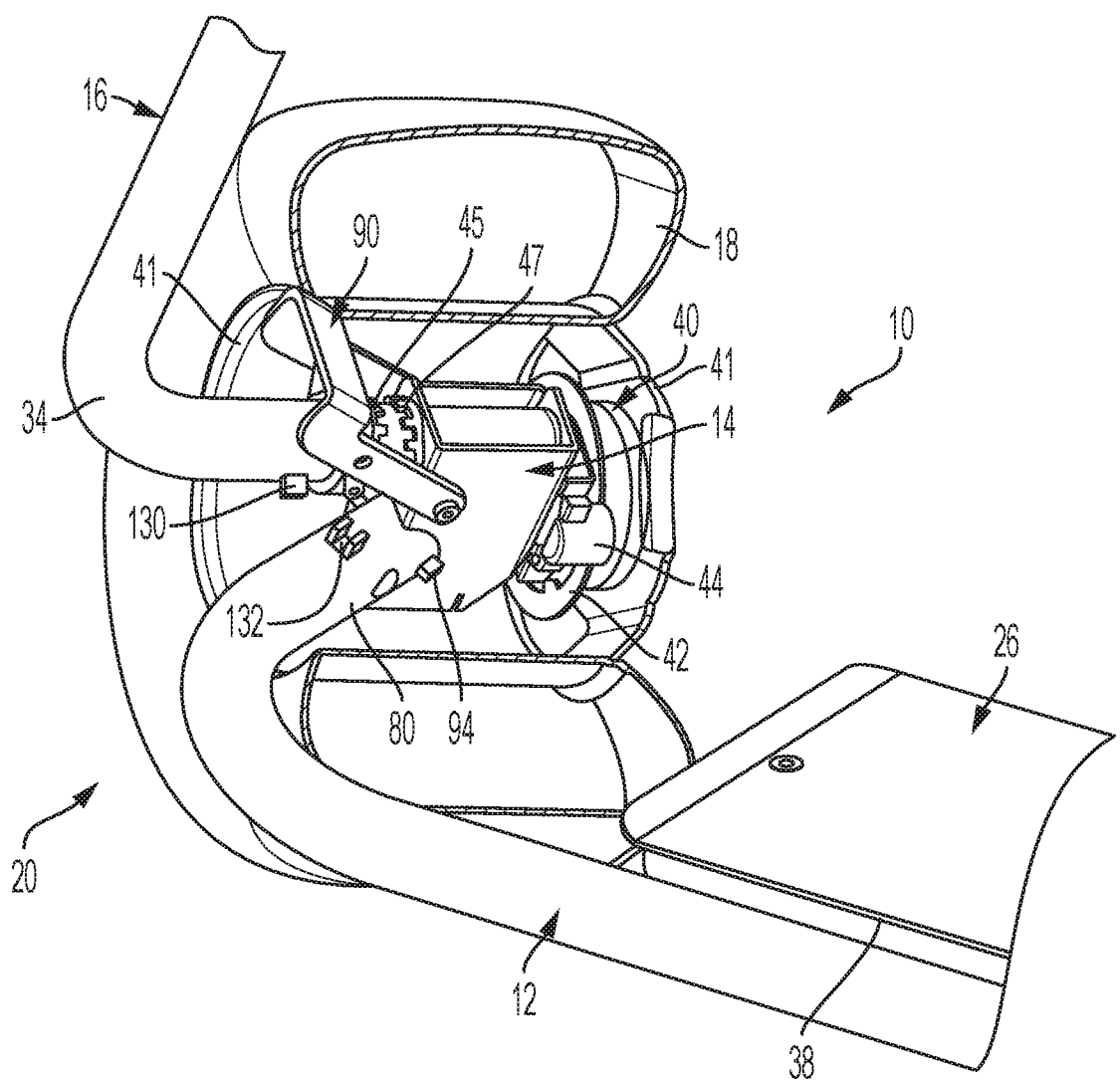
FIG. 5 shows a detailed cross-section view of a front wheel of a vehicle in accordance with a representative embodiment of the present disclosure.

Referring now to FIG. 5, a detailed, partial cross-sectional view of front wheel assembly 20 is shown. In some embodiments, front rim 41 comprises an internal space in which is contained various components of vehicle 10. For example, in some embodiments an internal space of front rim 41 is sized and configured to contain front hub 40, brake disc 42, brake caliper 44, and spindle 14. In some embodiments, front rim 41 further houses locking mechanism 90 whereby a user may selectively release, adjust, and set a desired acute angle position for steering arm 16. In some embodiments, locking mechanism 90 is spring loaded or otherwise biased into a locked position, such that when locking mechanism 90 is released it automatically resumes a locked position. In some embodiments, locking mechanism 90 is operably coupled to steering arm 16, wherein a locked position of locking mechanism 90 also resumes a locked position of steering arm 16.

In some embodiments, a desired acute angle position for steering arm 16 is selected and maintained via a keyed interface. For example, in some embodiments proximal end 34 of steering arm 16 comprises a first keyed interface surface 45 configured to selectively engage a second keyed interface surface 47 provided on spindle 14. In some instances, steering arm 16 is secured to, and inwardly biased towards spindle 14, such that first and second keyed interfaces surfaces 45 and 47 are interlocked by default. Upon actuating locking mechanism 90, steering arm 16 is temporarily biased outwardly and away from spindle 14, such that first and second keyed interface surfaces 45 and 47 are separated, and steering arm 16 is able to rotate relative to spindle 14 (into one of multiple possible positions relative to the front wheel assembly 20 and the frame 12, etc.). Upon release of locking mechanism 90, steering arm 16 is again biased inwardly toward spindle 14, thereby re-engaging first and second keyed interface surfaces 45 and 47 as steering arm 16 returns to its default position relative to spindle 14.

In some embodiments, vehicle 10 comprises a steering lock configured to prevent front wheel assembly 20 from pivoting when steering arm 16 is maximally lowered into a folded position. In some embodiments, a steering lock comprises a tab 130 provided on proximal end 34 of steering arm 16, and further comprises a groove 132 provided on front end 80 of frame 12 in proximity to tab 130. Tab 130 and groove 132 are positioned such that when steering arm 16 is maximally lowered into a folded position, tab 130 aligns with groove 132, wherein upon release of locking mechanism 90, tab 130 inserts within groove 132 thereby preventing front wheel assembly 20 from pivoting or turning movements while vehicle 10 is in the folded configuration.

Figure 6:
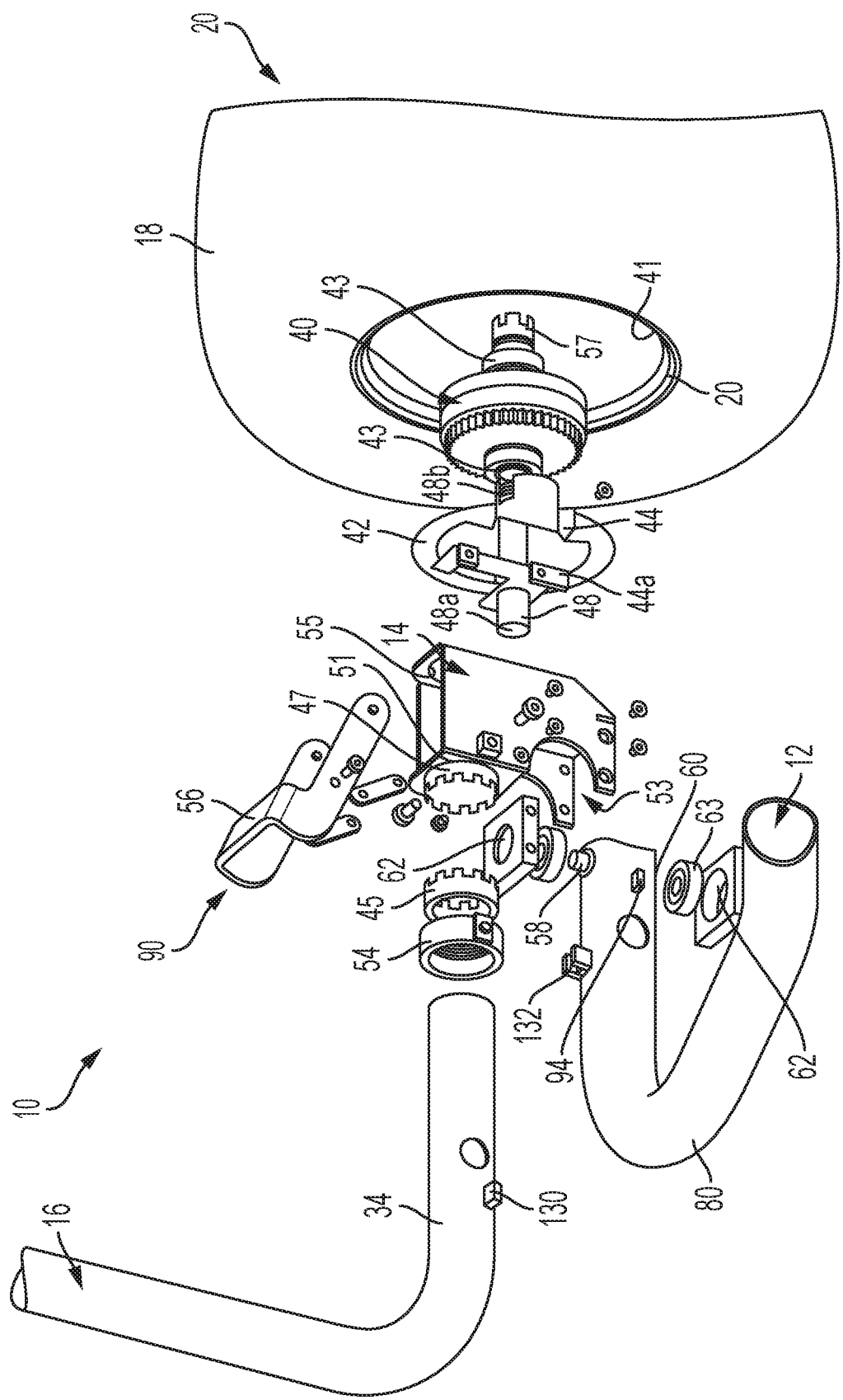
FIG. 6 shows an exploded view of a front wheel of a vehicle in accordance with a representative embodiment of the present disclosure.

Referring now to FIG. 6, an exploded view of a steering assembly, brake assembly, and hub components of vehicle 10, is shown. The steering assembly generally comprises spindle 14 having a first opening 51 for receiving proximal end 34 of steering arm 16 in a rotatable manner. In some embodiments, first opening 51 comprises inner and outer apertures such that proximal end 34 passes entirely through spindle 14. First opening 51 further comprises second keyed interface surface 47 fixedly coupled to an outer surface of spindle 14 and configured to compatibly and selectively engage first keyed interface surface 45 fixedly coupled to proximal end 34. In some embodiments, first keyed interface surface 45 is rotatably coupled to collar 54. Collar 54 is hingedly coupled to handle 56 of locking mechanism 90, wherein actuation of handle 56 moves collar 54 laterally inward and outward, thereby engaging and disengaging first keyed interface surface 45 from second keyed interface surface 47. The rotatable connection between first keyed interface surface 45 and collar 54 permits rotation of proximal end 34 of steering arm 16 within first opening 51 when handle 56 of locking mechanism 90 is actuated. In some embodiments, handle 56 comprises a default locked state, wherein first and second keyed interface surfaces 45 and 47 are engaged by default. In some instances, the default locked state is maintained by a biasing element, such as a spring or similar device that inwardly biases proximal end 34 into first opening 51. The biasing element is temporarily defeated or overcome by actuating handle 56, thereby disengaging first and second keyed interface surfaces 45 and 47 and permitting free rotation of steering arm 16 relative to first opening 51. In some embodiments, handle 56 is pivotally coupled to spindle 14 and collar 54 via various fasteners known to one having skill in the art.

Spindle 14 further comprises a second opening 53 for receiving front end 80 of frame 12. Second opening 53 comprises proximal and distal cutouts configured to permit forward and backward pivoting of front end 80 relative to spindle 14. Front end 80 is secured to spindle 14 through opening 53 via upper and lower mounting blocks 62. Upper and lower mounting blocks 62 comprise upper and lower bearings 63. Bearings 63 comprise respective receptacles for receiving an upper nub 58 and lower nub 60 of a steering axle coupled to, or comprising a portion of, front end 80. Mounting blocks 62 are secured to spindle 14 via various fasteners known to one having skill in the art. In some embodiments, one or more stops 94 are provided on front end 80 in proximity to second opening 53, wherein stops 94 contact and bind against second opening 53 to limit or prevent pivoting movement of spindle 14 relative to front end 80. In some embodiments, stops 94 are positioned to prevent contact between front tire 18 and frame 12 (or another component of vehicle 10) (e.g., when steering with steering arm 16, etc.). In some embodiments, stops 94 are positioned to prevent contact between two or more components or surfaces of vehicle 10 while steering or otherwise operating vehicle 10.

Spindle 14 further comprises a third opening 55 (obscured) located on a wheel-side of spindle 14, which is opposite the side of spindle 14 on which first and second openings 51, 53 are located, wherein third opening 55 is configured to receive front axle 48. Front axle 48 comprises a proximal end 48a, a threaded end 48b, and a shaft body extending therebetween. Proximal end 48a is fixedly secured to spindle 14 such that threaded end 48b and shaft body extend outwardly from the wheel-side of spindle 14.

Spindle 14 further includes brake caliper 44 of brake assembly. Brake caliper 44 is coupled to spindle 14 via a bracket 44a. Bracket 44a comprises a first set of mounting holes by which bracket 44a is attached to the wheel-side of spindle 14 via fasteners. Bracket 44a further comprises a second set of mounting holes by which brake caliper 44 is coupled to bracket 44a. In some embodiments, bracket 44a further comprises an opening through which front axle 48 is inserted. In some embodiments, brake caliper 44 is coupled to spindle 14 and/or axle 48 without requiring a bracket and/or fasteners.

The brake assembly of vehicle 10 further comprises brake disc 42, or similarly compatible braking system and components. Brake disc 42 is coupled to an inner surface of front hub 40 via various fasteners known to one having skill in the art. Front hub 40 comprises inner and outer wheel bearings 43 having receptacles for receiving the shaft body of front axle 48. Front axle 48 further comprises a crown nut 57 which threadedly engages threaded end 48b to secure front hub 40 to spindle 14, and allow preload adjustment for inner and outer wheel bearings 43. Front hub 40 further comprises one or more lug bolts or threaded receptacles coupling front rim 41 and front tire 18 to spindle 14 via hub 40 and front axle 48.

Figure 7:
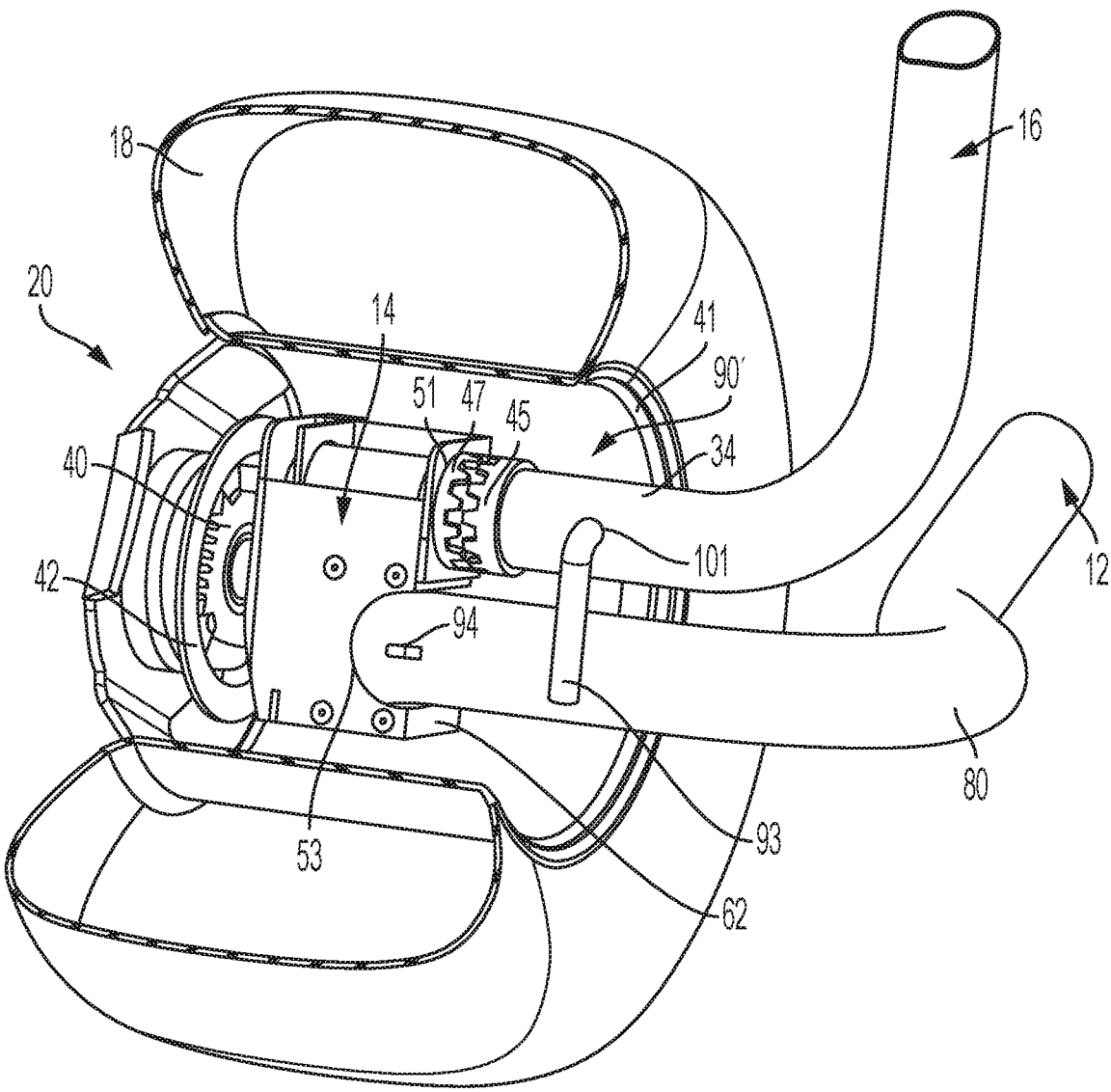
FIG. 7 shows a detailed cross-section view of a front wheel of a vehicle in accordance with a representative embodiment of the present disclosure.
Figure 8:
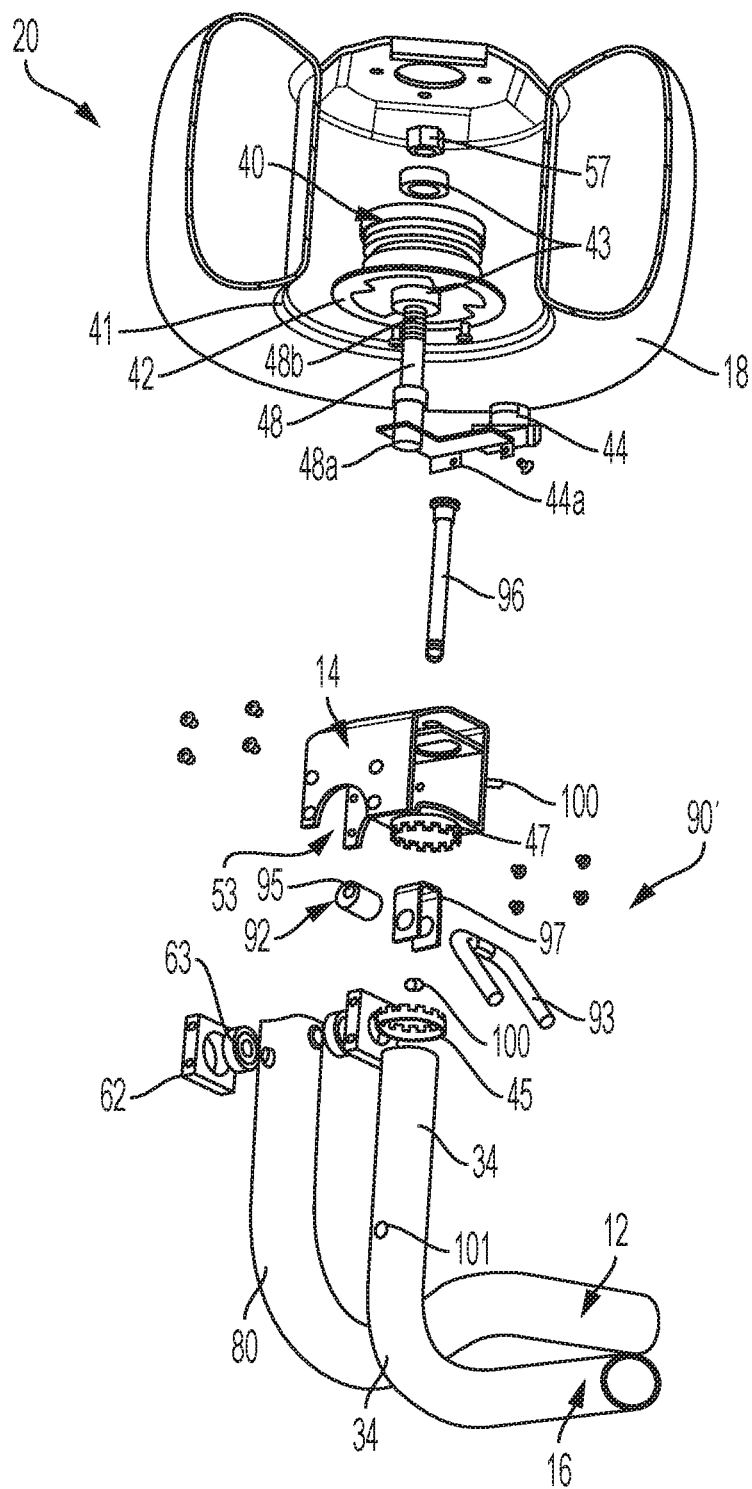
FIG. 8 shows an exploded cross-section view of a front wheel of a vehicle in accordance with a representative embodiment of the present disclosure.
Figure 9:
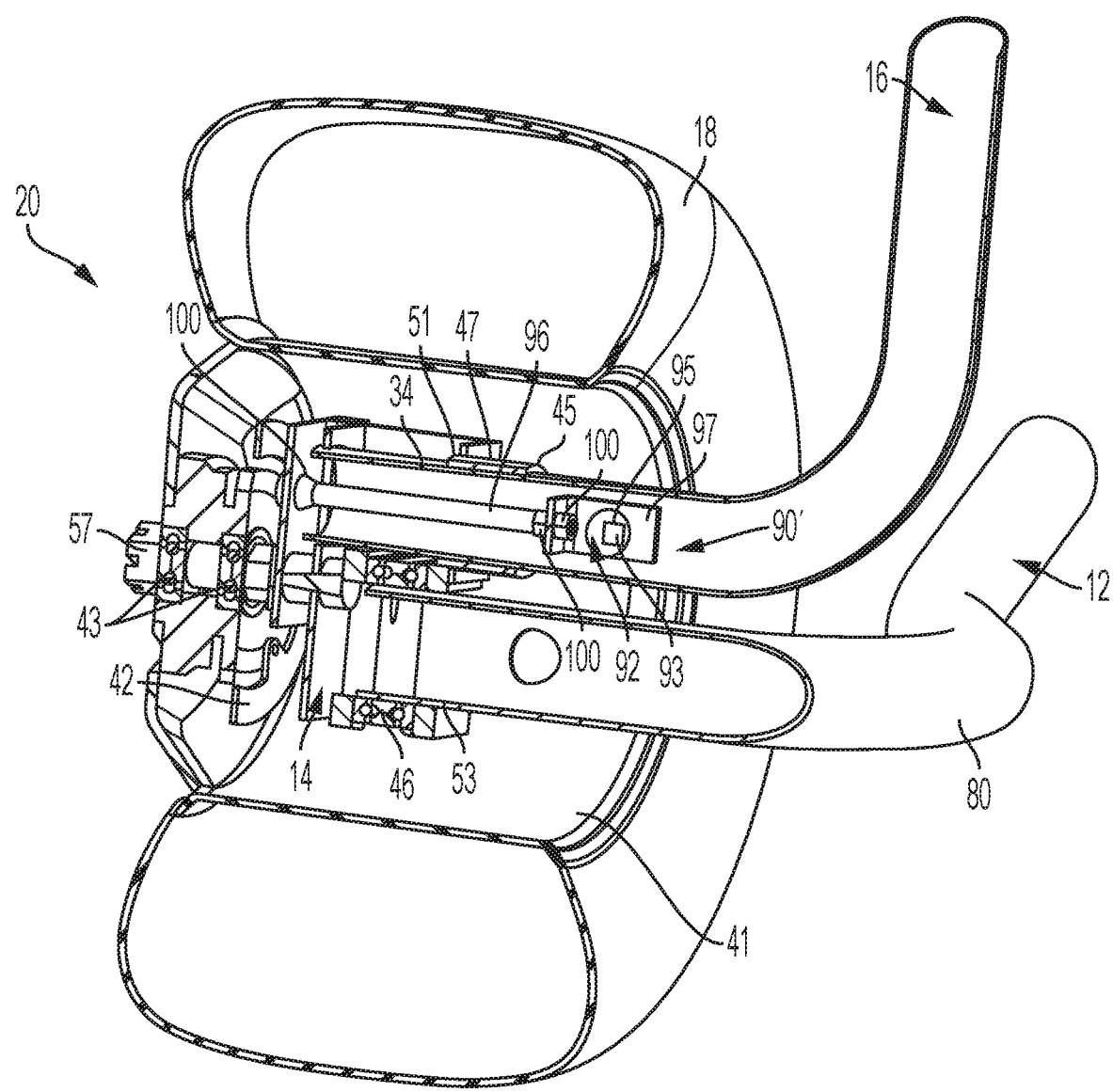
FIG. 9 shows a detailed cross-section view of a front wheel of a vehicle in accordance with a representative embodiment of the present disclosure.

Referring now to FIGS. 7-9, various views of an embodiment of a front wheel assembly 20 are shown having an alternative embodiment of a locking mechanism 90'. FIG. 7 shows locking mechanism 90' in an actuated configuration, wherein first and second keyed interface surfaces 45 and 47 are disengaged. Locking mechanism 90' is actuated by rotating handle 93 into a horizontal or downward position, wherein a default, locked state of locking mechanism 90' is achieved when handle 93 is in an upright position (see, for example, FIG. 10). In some embodiments, handle 93 may be rotated 180° from the default position such that inner and outer arms of handle 93 straddle front end 80 of frame 12 (FIG. 7). In this configuration, inner and outer arms of handle 93 restrict rotation of spindle 14 relative to front end 80. In some instances, inner and outer arms of handle 93 further prevent, or limit, rotation of proximal end 34 of steering arm 16 relative to first opening 51 of spindle 14. Thus, an actuated configuration of locking mechanism 90' may be configured to simultaneously maintain locked positions for wheel assembly 20 and steering arm 16.

Locking mechanism 90' is coupled to spindle 14 via a tension rod 96. Tension rod 96 is inserted through an opening in the wheel-side of spindle 14 such that a head end of tension rod 96 binds against the wheel-side surface, and a shaft portion of tension rod 96 extends through first opening 51 of spindle 14 and into a hollow interior of proximal end 34 of steering arm 16, wherein a threaded end of tension rod 96 is coupled to the hollow interior of proximal end 34 via a U-shaped bracket 97 and fasteners 100. The arms of U-shaped bracket 97 each comprise a round aperture configured to rotatably receive a cam 92 having a keyed aperture 95 for receiving a keyed middle portion of handle 93. The keyed interface between keyed aperture 95 and the keyed middle portion of handle 93 prevents rotation of handle 93 within keyed aperture 95. Keyed aperture 95 is further offset from an axial center of cam 92, thus rotation of handle 93 and cam 92 within the round apertures of U-shaped bracket 97 rotates cam 92 about a central axis of the keyed middle portion of handle 93, thereby increasing and decreasing a distance between keyed aperture 95 and the stationary position of tension rod 96. Round portions of handle 93 adjacent to the keyed middle portion of handle 93 further pass through round openings 101 in proximal end 34. Rotation of handle 93 in round openings 101 simultaneously rotates handle 93 and cam 92 about a central axis of the round and keyed middle portions of handle 93, thereby shifting a position or depth of insertion of proximal end 34 within first opening 51. Thus, an actuated configuration or position of locking mechanism 90' is achieved when handle 93 is rotated into a position that maximally (or sufficiently) distances keyed aperture 95 from the stationary position of tension rod 96, thereby displacing proximal end 34 from first opening 51 a distance sufficient to disengage first and second keyed interface surfaces 45 and 47, as shown in FIGS. 7 and 9. Conversely, a default, neutral or locked configuration or position of locking mechanism 90' is achieved when handle 93 is rotated into a position that minimizes a distance between keyed aperture 95 and tension rod 96, thereby drawing proximal end 34 of steering arm 16 further into first opening 51 of spindle 14 such that second keyed interface surface 47 engages first keyed interface surface 45 (and vice-versa).

Figure 10:
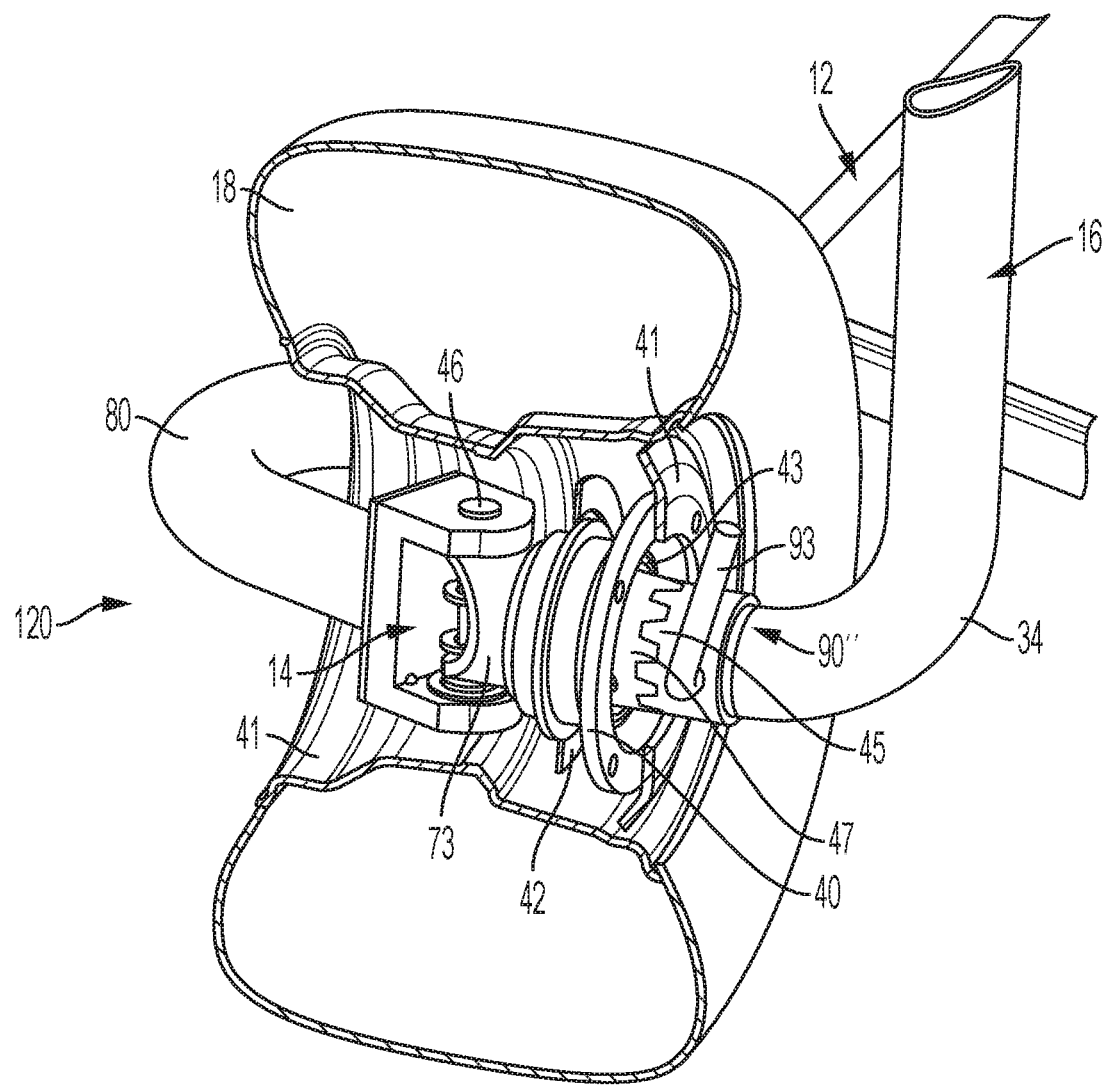
FIG. 10 shows a detailed cross-section view of a front wheel of a vehicle in accordance with a representative embodiment of the present disclosure.
Figure 11:
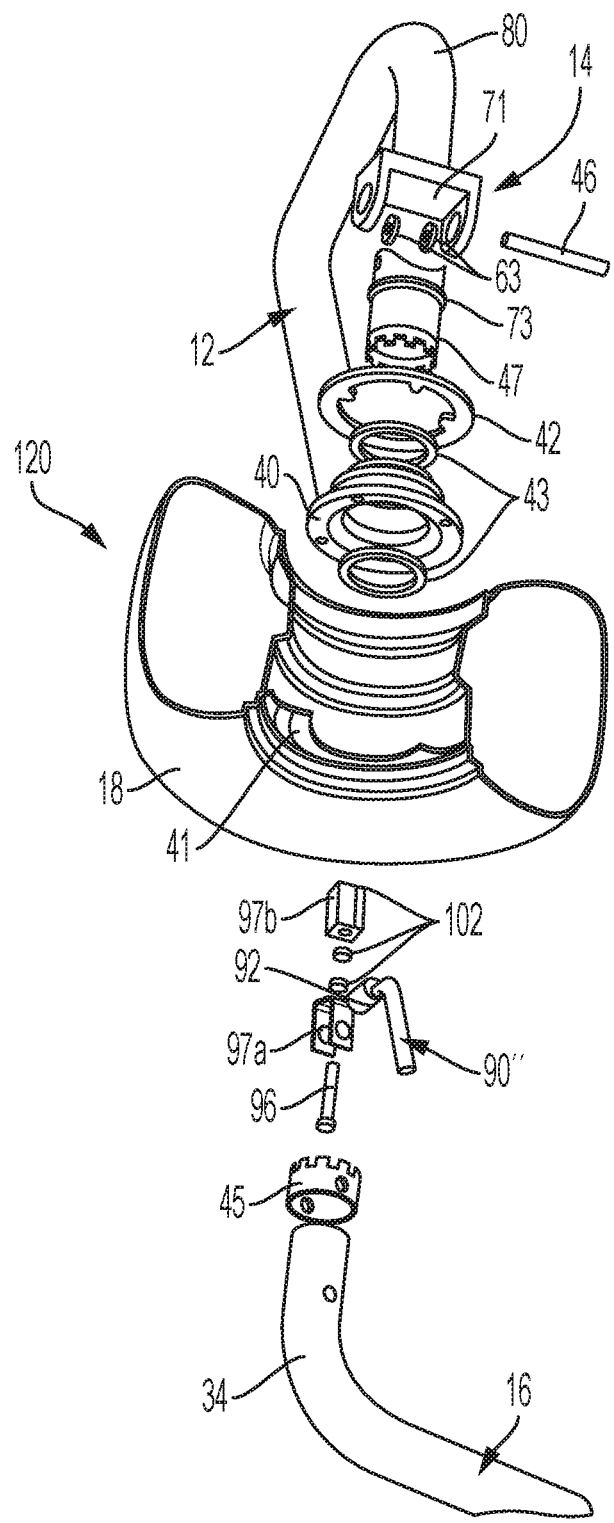
FIG. 11 shows an exploded view of a front wheel of a vehicle in accordance with a representative embodiment of the present disclosure.
Figure 12:
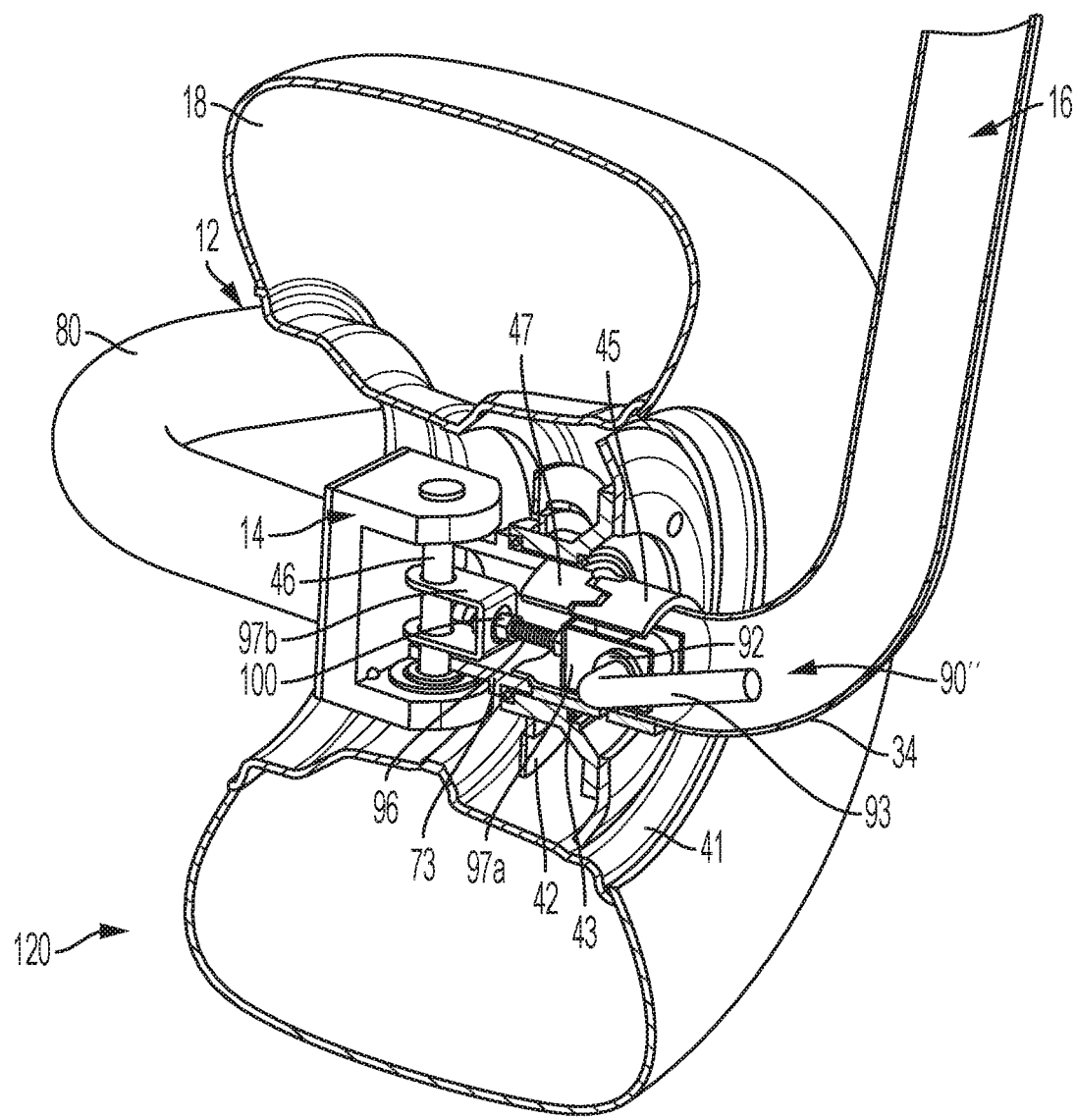
FIG. 12 shows a detailed cross-section view of a front wheel of a vehicle in accordance with a representative embodiment of the present disclosure.

Referring now to FIGS. 10-12, various views of an embodiment of another front wheel assembly 120 of vehicle 10 are shown. In some embodiments, front end 80 of frame 12 and steering arm 16 engage opposite sides of front wheel assembly 120 to provide a "through-wheel" configuration. A representative through-wheel configuration of the vehicle 10 generally comprises spindle 14 that is directly coupled to an end surface of front end 80, wherein an end length of front end 80 is shaped or contoured into a position or orientation that is approximately parallel to a central or rotational axis of front rim 41 when front wheel assembly 120 is in a neutral or straight orientation. In some embodiments, spindle 14 is coupled to front end 80 of frame 12 via a weld. In this embodiment, spindle 14 comprises a U-shaped channel 71 having upper and lower apertures configured to receive steering axle 46. Spindle 14 further comprises a steering knuckle 73 that is coupled to U-shaped channel 71 via steering axle 46. Spindle 14 further comprises upper and lower bearings 63 which are coupled to steering axle 46 and positioned to reduce friction between steering knuckle 73 and the remaining components of spindle 14. An opposite end of steering knuckle 73 comprises second keyed interface surface 47, which comprises a component of another locking mechanism 90". In some embodiments, steering axle 46 and/or second keyed interface surface 47 is further secured to spindle 14 via one or more fasteners.

Front wheel assembly 120 further comprises a hub assembly comprising front hub 40 that is rotatably coupled to an outer surface of steering knuckle 73 via inner and outer wheel bearings 43. Front wheel assembly 120 may further comprise brake disc 42 for use with a brake caliper (not shown). In some embodiments, a brake caliper is coupled to a portion of steering knuckle 73 that is interposed between front hub 40 and U-shaped channel 71, wherein a brake cable or other components for operating the brake assembly are routed through or along front end 80 of frame 12 (and/or other parts of frame 12).

Front wheel assembly 120 further comprises locking mechanism 90". Locking mechanism 90" is located on and within proximal end 34 of steering arm 16 and steering knuckle 73. In this embodiment, locking mechanism 90" comprises an outer U-shaped bracket 97a located within proximal end 34 of frame 12 and having round apertures for receiving a cam 92, wherein cam 92 comprises an offset keyed aperture for receiving a keyed surface of handle 93. First keyed interface surface 45 and proximal end 34 further comprise generally corresponding round apertures through which non-keyed surfaces of handle 93 are inserted, such that rotation of handle 93 within the round apertures of first keyed interface surface 45 and proximal end 34 rotates cam 92 within apertures of outer U-shaped bracket 97a about a central axis of the keyed and non-keyed surfaces of handle 93, thereby pulling, pushing and shifting the position of outer U-shaped bracket 97a within proximal end 34 and steering knuckle 73, in a manner similar to U-shaped bracket 97 of FIGS. 7-9.

The locking mechanism 90" of FIGS. 10-12 further comprises an inner U-shaped bracket 97b positioned within steering knuckle 73 and having vertically-aligned apertures for coupling to a shaft portion of steering axle 46. A base portion of inner U-shaped bracket 97b further comprises an aperture in horizontal alignment with a similarly positioned aperture of U-shaped bracket 97a, wherein inner and outer U-shaped brackets 97b and 97a are joined together via tension rod 96 coupled to the horizontally aligned apertures. Tension rod 96 is secured to inner and outer U-shaped brackets 97b and 97a via fasteners 100, wherein fasteners 100 maintain a position of tension rod 96 and a set distance between the connected U-shaped brackets 97a and 97b.

Rotation of handle 93 simultaneously rotates handle 93, cam 92, and round apertures of outer U-shaped bracket 97a about a central axis of the keyed and non-keyed middle portions of handle 93, thereby shifting the position of proximal end 34 of steering arm 16 and first keyed interface surface 45 relative to the stationary positions of inner and outer U-shaped brackets 97b, 97a. A shifting of the position of proximal end 34 adjusts a depth of engagement between first and second keyed interface surfaces 45 and 47. Thus, an actuated configuration or position of locking mechanism 90'' is achieved when handle 93 is rotated into a position that maximally (or sufficiently) distances the keyed aperture of cam 92 from inner U-shaped bracket 97b, thereby displacing proximal end 34 of steering arm 16 and first keyed interface surface 45 from second keyed interface surface 47. Conversely, a default, neutral or locked configuration or position of locking mechanism 90'' is achieved when handle 93 is rotated into a position that minimizes (or sufficiently decreases) a distance between the keyed aperture of cam 92 and inner U-shaped bracket 97b, thereby minimizing a distance between first and second keyed interface surfaces 45 and 47.

Figure 13A:
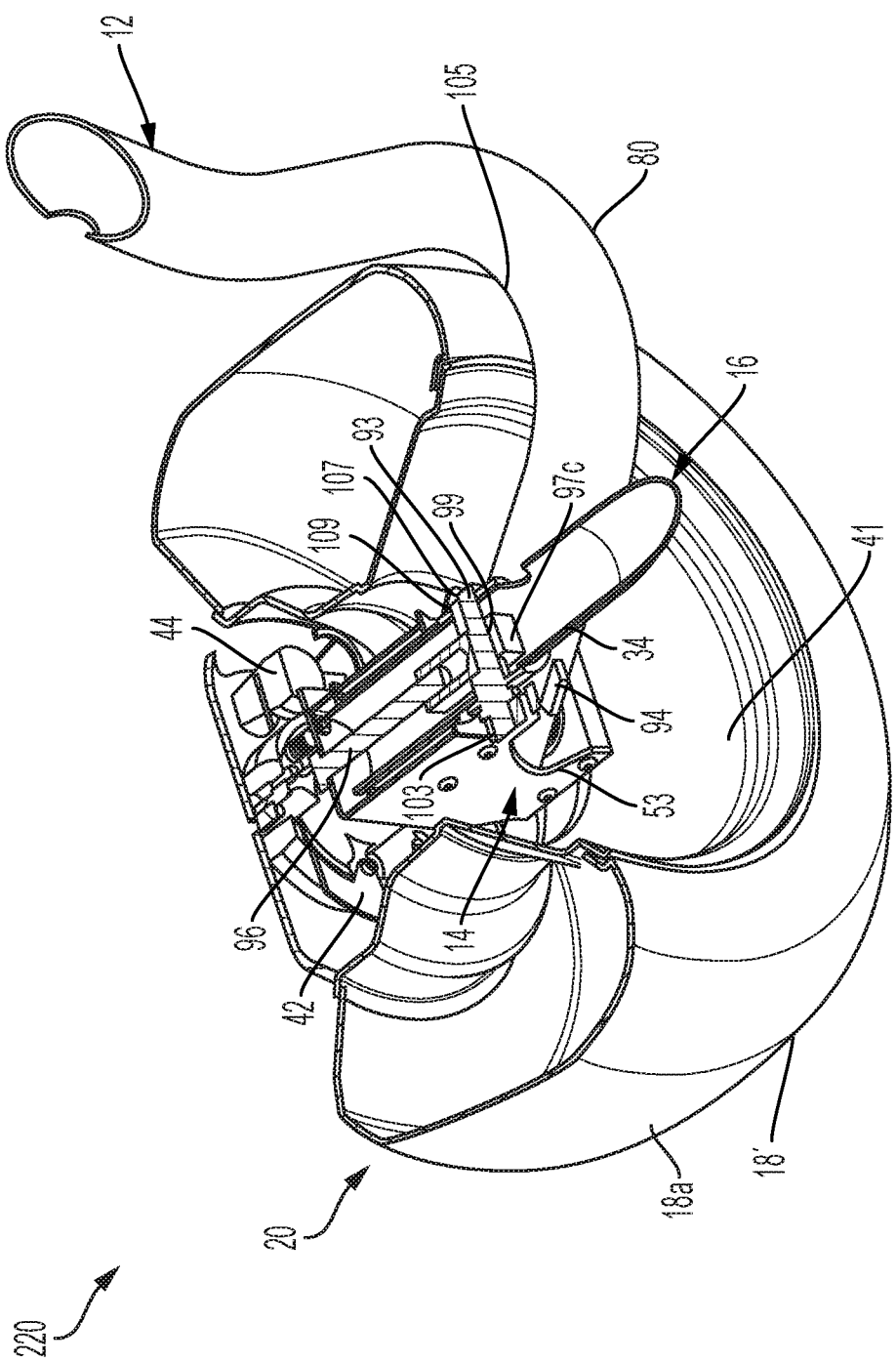
FIGS. 13A and 13B show detailed partial perspective and cross-section views of a front wheel of a vehicle in accordance with a representative embodiment of the present disclosure.
Figure 13B:
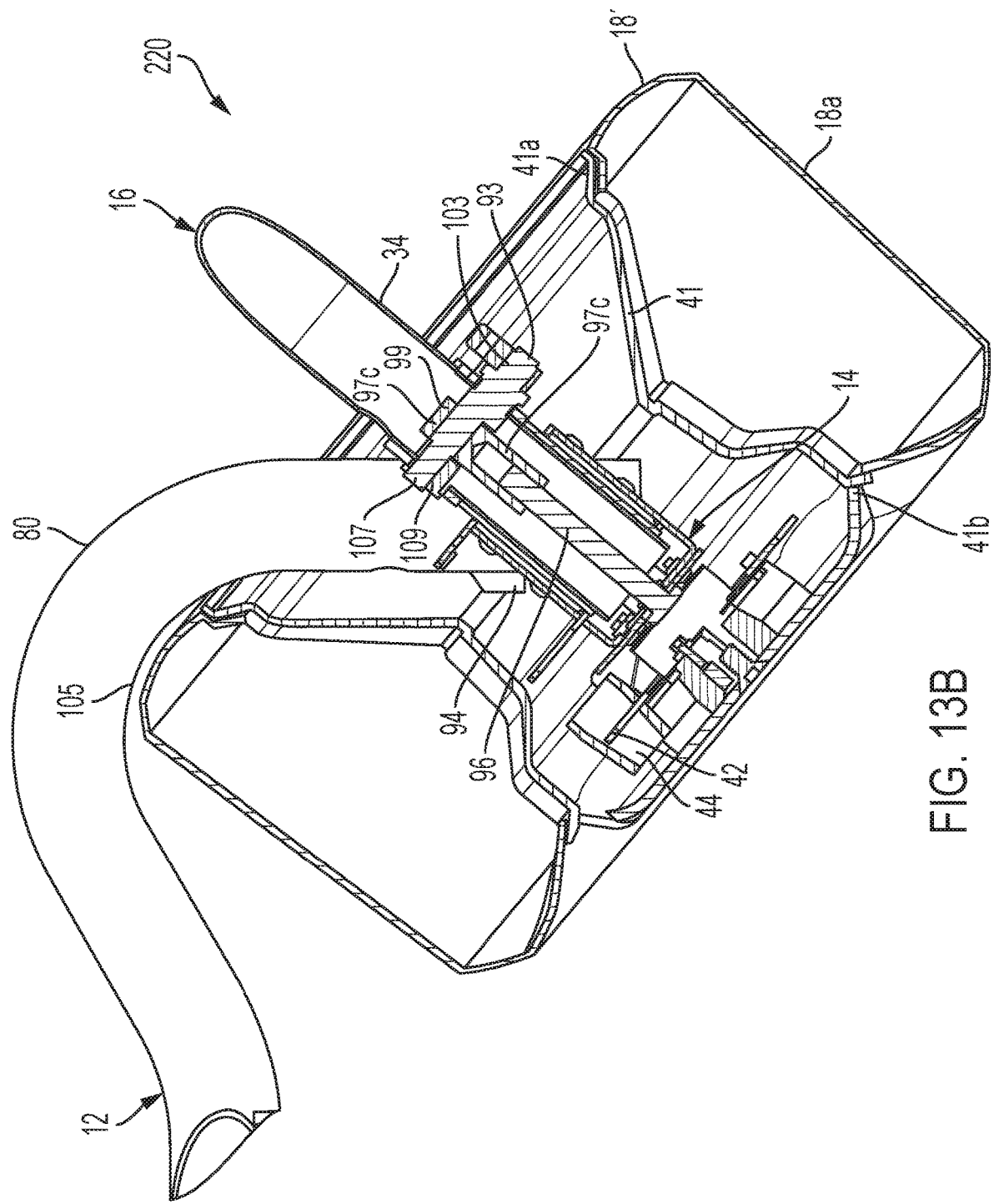

Referring now to FIGS. 13A and 13B, partial cross-sectional perspective and top views of another front wheel assembly 220 are shown, wherein front tire 18', front rim 41, and steering arm 16 are maximally turned to the right (as viewed in the figures). In some embodiments, the stability and handling of vehicle 10 is improved by providing front rim 41 having an inner or frame-side rim diameter 41a (FIG. 13B) that is greater than an outer or opposite-side rim diameter 41b. In order to accommodate this modification and maintain a desired turning radius for front wheel 20 of the assembly 220, front end 80 of frame 12 is shaped and configured to include a tire recess or carve out 105. In some embodiments, recess 105 comprises a bend or deviation in frame 12 having contours that match or resemble a cross-section profile of the inner or frame-side portion of front wheel 20, front rim 41 and/or front tire 18'. In some embodiments, the locations of stops 94 are adjusted to provide a desired turning radius while minimizing contact between front wheel 20 and frame 12.

With continued reference to FIGS. 13A and 13B, some embodiments of the present disclosure comprise a locking mechanism having a cam housing 97c having a threaded receptacle into which tension rod 96 is directly threaded. Cam housing 97c further comprises a distal aperture 99 through which is inserted a body of a shaft portion of handle 93. Handle 93 further comprises a first end 103 having an outer diameter that is greater than an outer diameter of end 107, wherein end 107 is held in axial alignment with end 103 via bushing 109, and wherein ends 103 and 107 are secured to and supported by at least one of proximal end 34 of steering arm 16 and second keyed interface surface (not shown). Upon rotation of handle 93, a distance between an outer surface of first end 103 and tension rod 96 varies due to the axial center of first end 103 being offset from an axis of rotation for handle 93. As the distance between first end 103 and tension rod 96 increases, an outer surface of first end 103 contacts and outwardly biases at least one of proximal end 34 and second keyed interface surface associated therewith. Conversely, as the distance between first end 103 and tension rod 96 decreases, first end 103 contacts and inwardly biases at least one of proximal end 34 and second keyed interface surface.

Also in this embodiment, front tire 18' includes a generally flattened portion 18a (e.g., a generally flattened tread portion, etc.) extending around a perimeter of the tire 18'. Such flattened portion 18a provides for a larger surface area of the tire 18' (in a generally lateral direction of the tire 18') to engage the ground, to thereby help facilitate self-balancing of the vehicle 10 (alone or in combination with various other self-balance features described herein). The flattened portion 18a of the tire 18' may have a width of about three inches to help facilitate such self-balancing, may have a width of about four inches to facilitate such self-balancing, may have a width of about five inches to facilitate such self-balancing, etc. In various embodiments, at least one of the front tire 18' and the rear tire of vehicle 10 may include such a flattened portion 18a. In some embodiments, both tires (or all tires) of vehicle 10 may include such a flattened portion. In some embodiments, two or more adjacent tires may be placed side by side on the same or adjacent hubs in place of the front tire 18' and/or in place of the rear tire 19'. One or more of the adjacent tires may lack or include a flattened portion 18a.

Figure 14A:
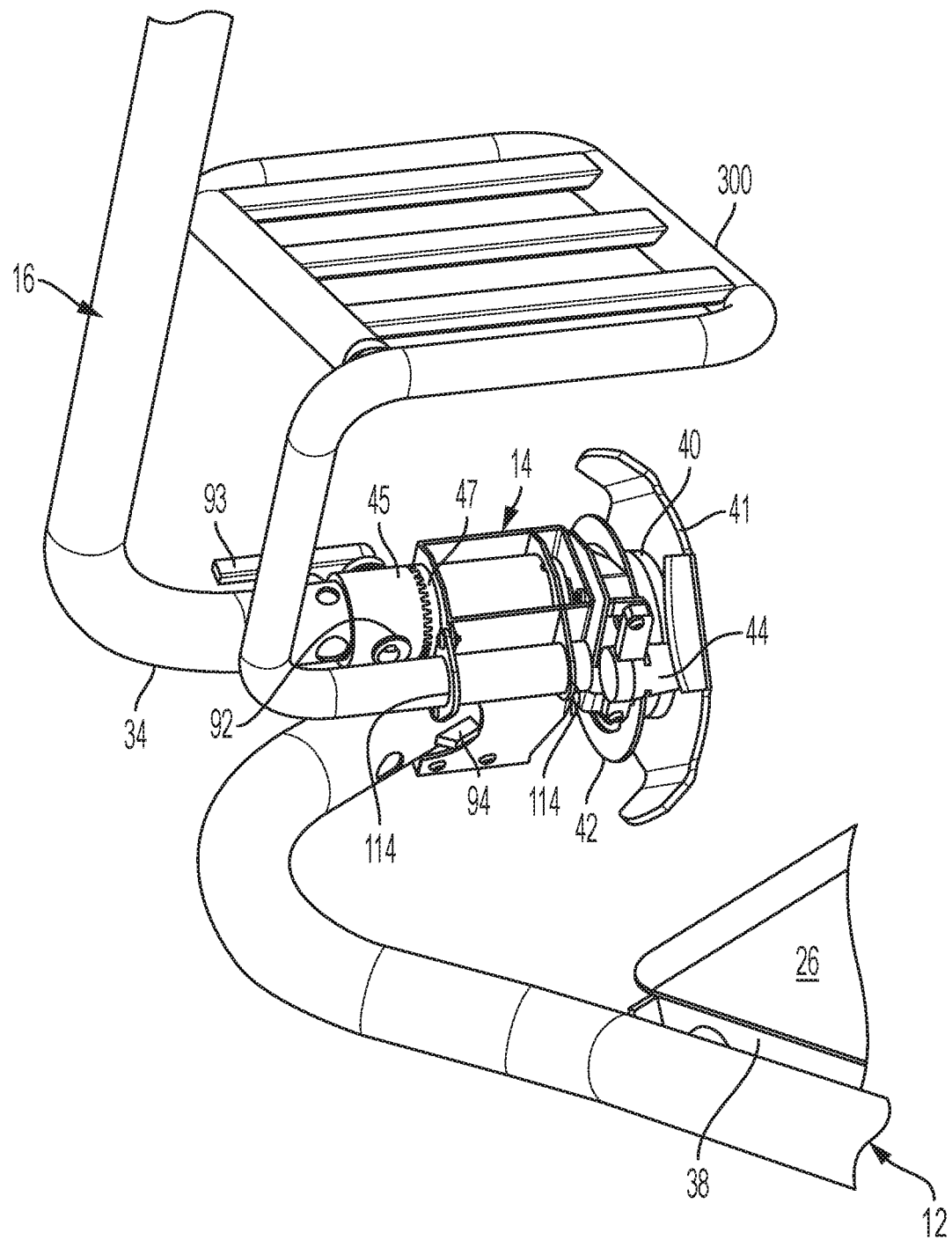
FIGS. 14A and 14B show detailed perspective views of a front wheel assembly of a vehicle in accordance with a representative embodiment of the present disclosure.
Figure 14B:
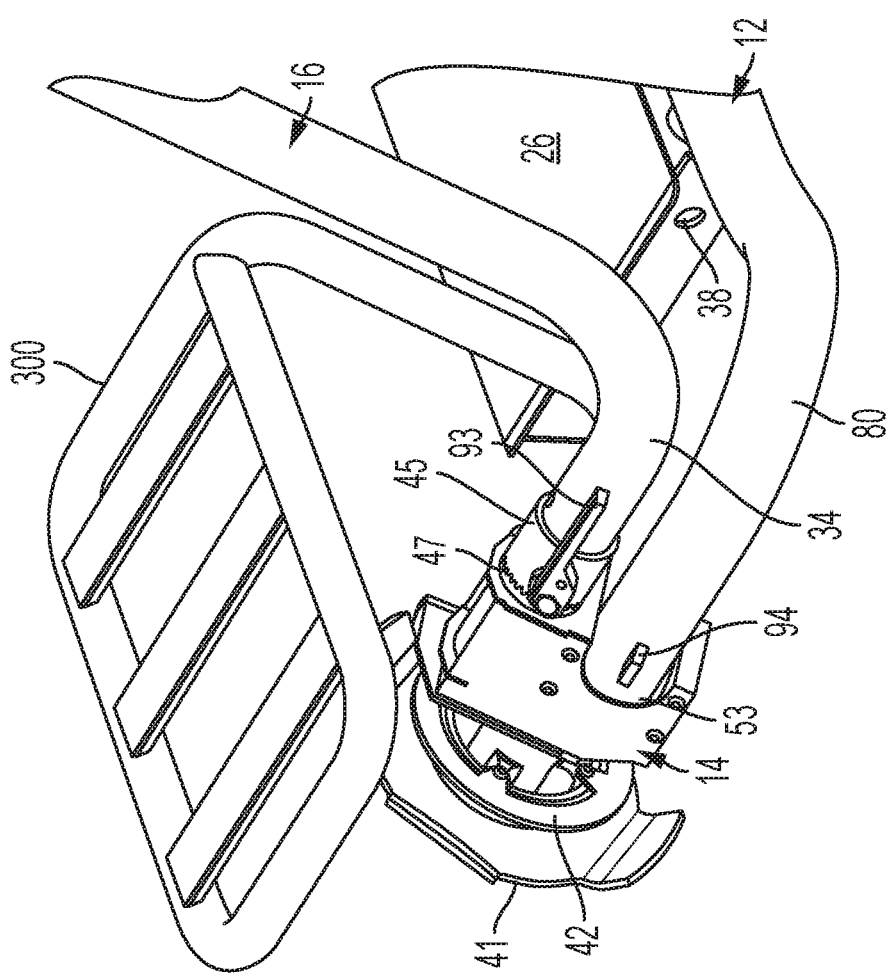

Referring now to FIGS. 14A and 14B, some embodiments of the present disclosure further comprise an additional structure or component that is coupled to the front wheel assembly via spindle 14. In some embodiments, spindle 14 comprises an auxiliary mount 114 (illustrated, without limitation, as two arms in this embodiment) with one or more apertures for receiving an arm or extension of an additional structure or component, such as a luggage rack 300. In some embodiments, rear hub 66 of vehicle 10, for example, may then further comprise an additional structure, such as a luggage rack (not shown).

In some embodiments, auxiliary mount 114 comprise an extension of one or more surfaces or walls of spindle 14. In some embodiments, auxiliary mount 114 comprises an add-on extension that is attached to one or more surfaces of spindle 14 via one or more fasteners. In some embodiments, an additional structure or component is rotatably coupled to auxiliary mount 114, whereby the additional structure or component may be lowered into a folded configuration. In some embodiments, auxiliary mount 114 further comprises a locking mechanism (not shown) whereby the additional component may be locked into one or more desired positions. In some embodiments, the additional component comprises a remote for controlling a locking mechanism. In some embodiments, a locking mechanism of steering arm 16 further controls a locked position of the additional component.

Figure 15A:
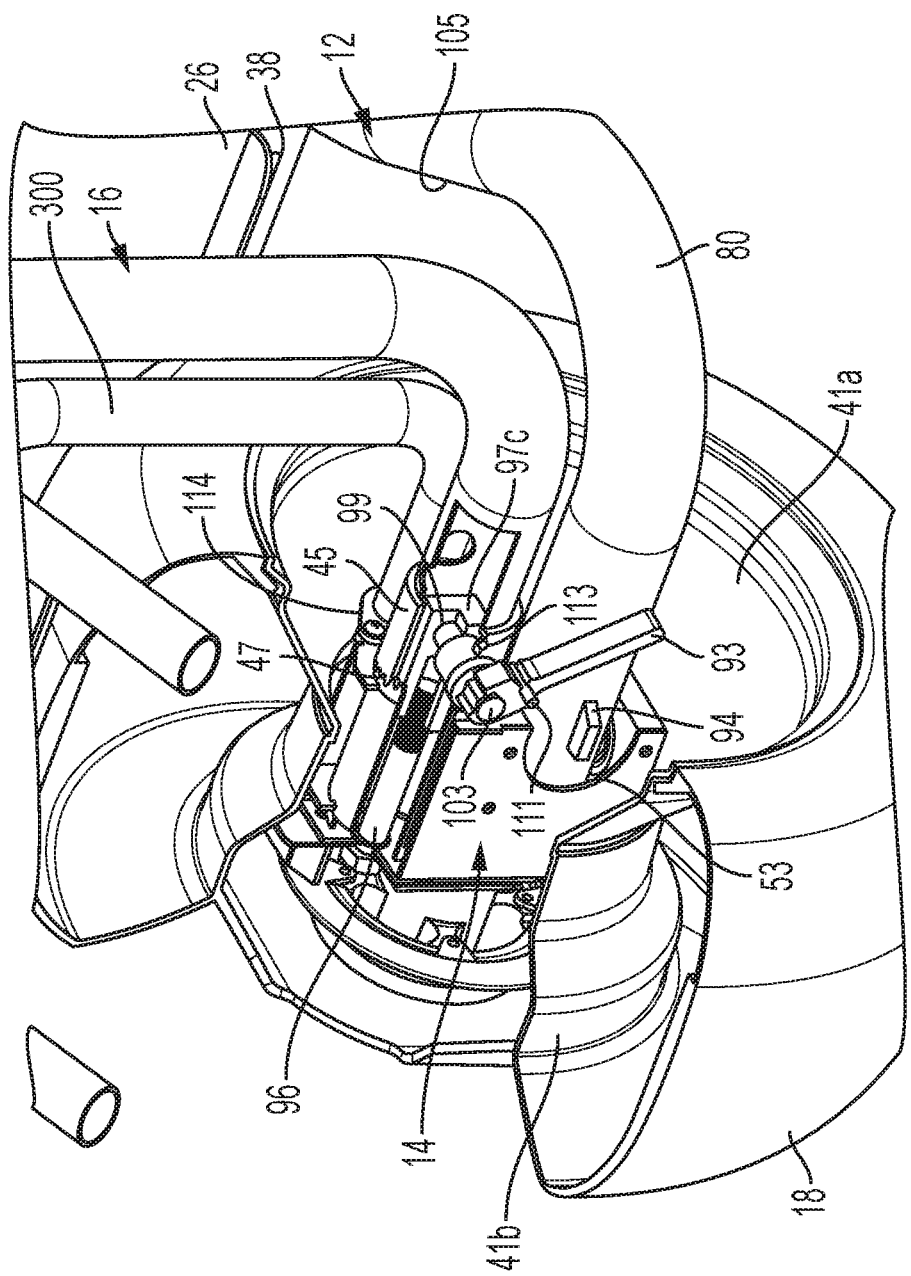
FIGS. 15A and 15B show detailed partial perspective and cross-section views of a front wheel of a vehicle in accordance with a representative embodiment of the present disclosure.
Figure 15B:
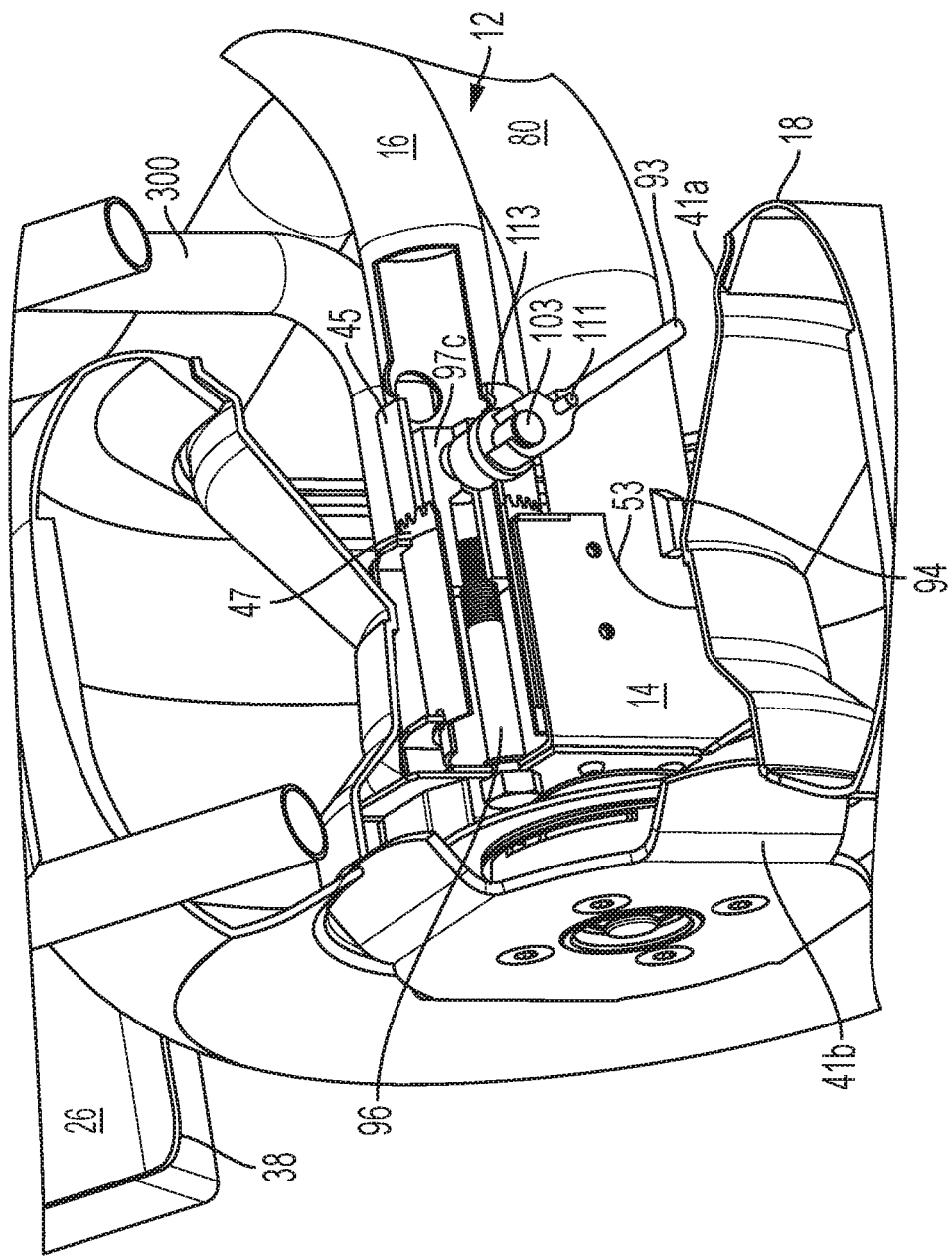

Referring now to FIGS. 15A and 15B, partial cross-sectional perspective and top views of a front wheel comprising a spindle 14, auxiliary mount 114, and other components in accordance with various components of the embodiments shown in FIGS. 13A-14B are shown. Further to the previous discussion, in some embodiments as lever or handle 93 is rotated, a cam or first end 103 of handle is rotated within distal aperture 99, thereby shifting a lateral position of keyed interface surface 45 relative to static position of keyed interface surface 45, thereby engaging and disengaging the two compatible interface surfaces 45 and 47. When disengaged, steering arm 16 is free to pivot about spindle 14 between upright and folded configurations. In some embodiments, a bolt head of tension rod 96 is positioned exterior to spindle 14, wherein a threaded insertion depth of tension rod 96 within a threaded receptacle of cam housing 97c may be adjusted via the bolt head to set a tension for tension rod 96. In some embodiments, a tension for tension rod 96 adjusts and sets the range of movement for handle 93 to enable engagement and disengagement of first and second keyed interface surfaces 45 and 47. In some embodiments, handle 93 further includes a lock comprising a pin 111 slidably positioned within an aperture of handle 93 and configured for selective insertion into a compatible aperture 113 provided in steering arm 16. When handle 93 is rotated into a position that disengages first and second keyed interface surfaces 45 and 47, pin 111 is aligned with aperture 113 such that pin 111 may be slid into aperture 113 to lock or maintain the position of handle 93 in a disengaged configuration. Pin 111 may further be slidably retracted from aperture 113, thereby releasing handle 93 to an engaged configuration, whereby first and second keyed interface surfaces 45 and 47 are engaged.

Figure 16:
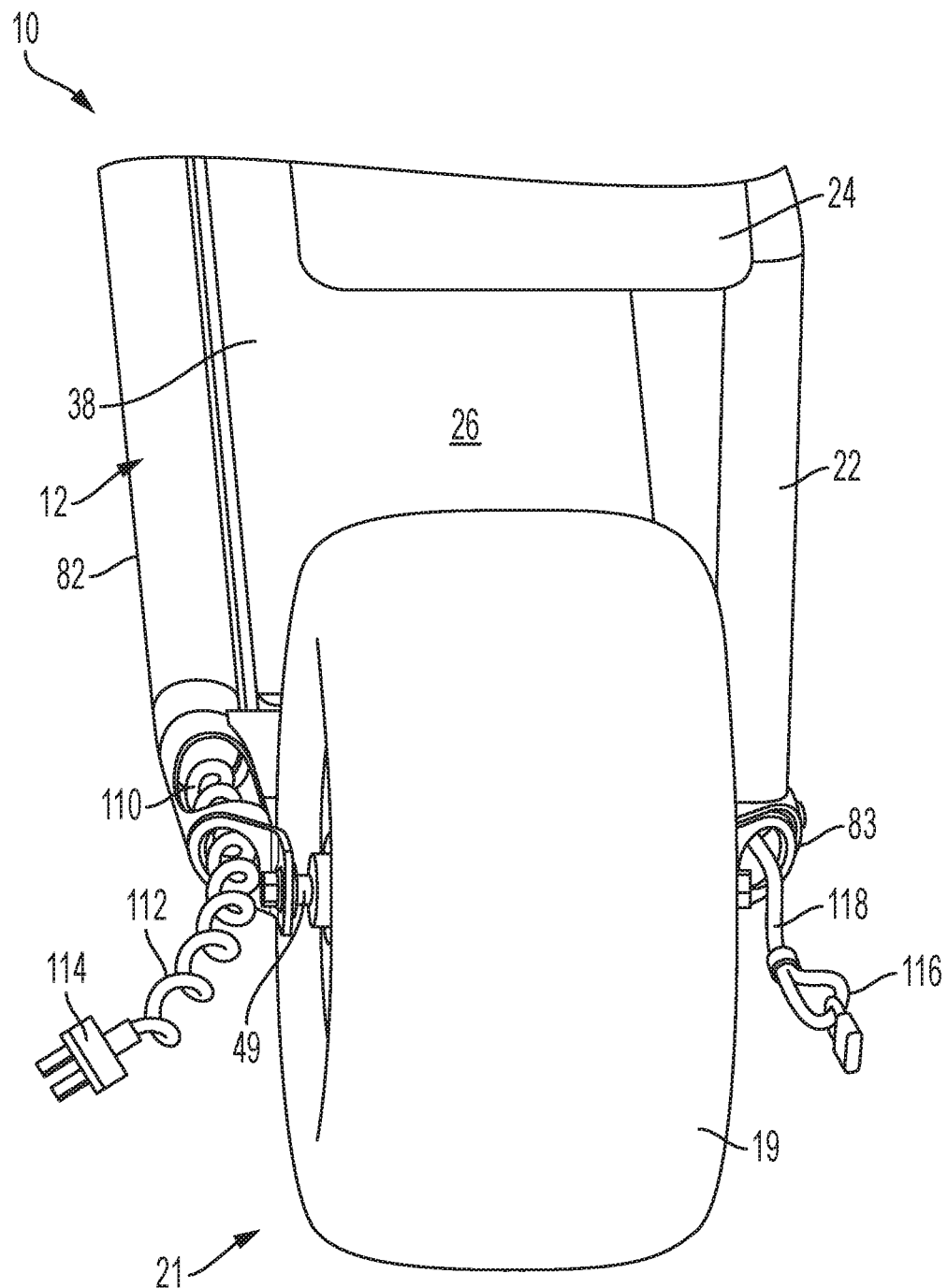
FIG. 16 shows a rear perspective view a vehicle in accordance with a representative embodiment of the present disclosure.

Referring now to FIG. 16, a rear perspective view of vehicle 10 is shown. In some embodiments, one or more surfaces of frame 12 are utilized to store various components for use in operating or using vehicle 10. For example, in some embodiments an interior compartment or surface of left-side rear end 82 comprises a retractable power cord 110. The power cord 110 utilizes the hollow tube chassis of the vehicle 10 to relay power lines 112 from the power supply (e.g., a battery) to a recharging source. Power cord 110 comprises an electrical connector or plug 114 whereby the user connects power cord 110 to a power source. Vehicle 10 may further comprise one or more theft-deterrent devices, such as a cable or chain 118, wherein one end of the chain or cable 118 is permanently affixed to frame 12 (such as an inner wall surface of the hollow tube chassis at right-side rear end 83). In connection therewith, the chain or cable 118 includes an end portion 116 that may be used to lock or otherwise secure the vehicle 10 to a desired surface, structure, or location (e.g., via a lock, etc.).

Figure 17:
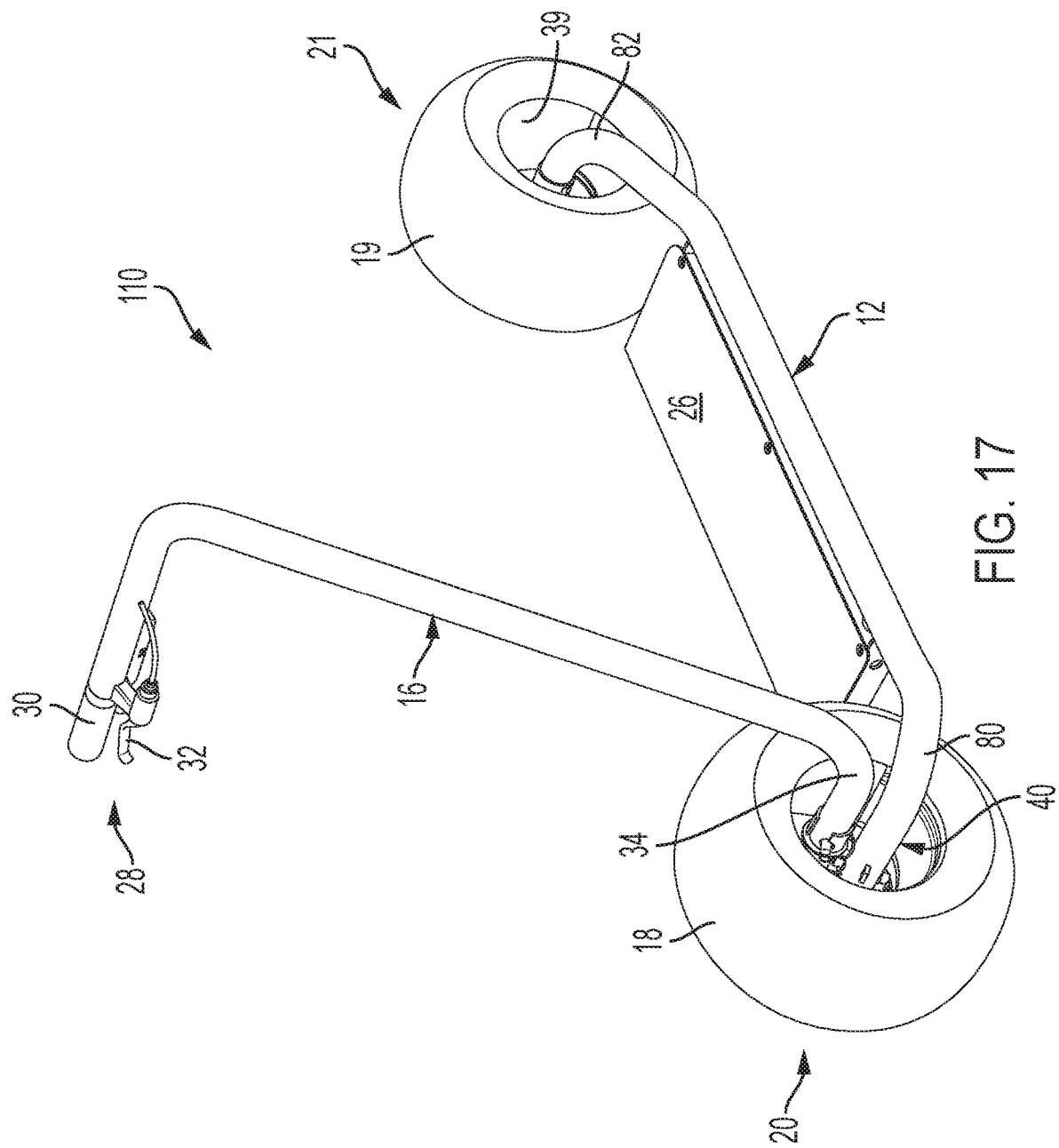
FIGS. 17 and 18 show perspective views of another embodiment of a vehicle in accordance with the present disclosure.
Figure 18:
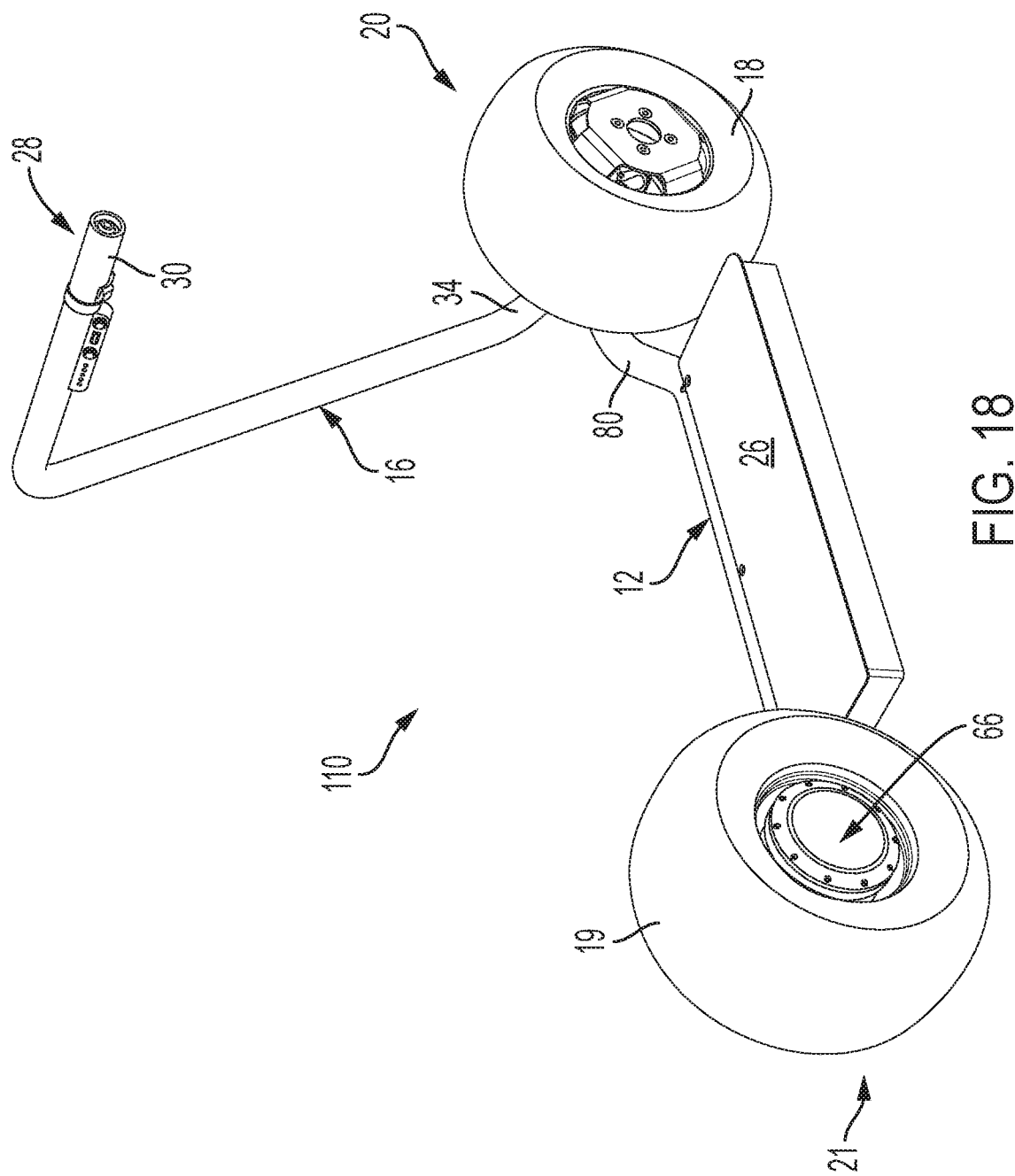
Figure 19:
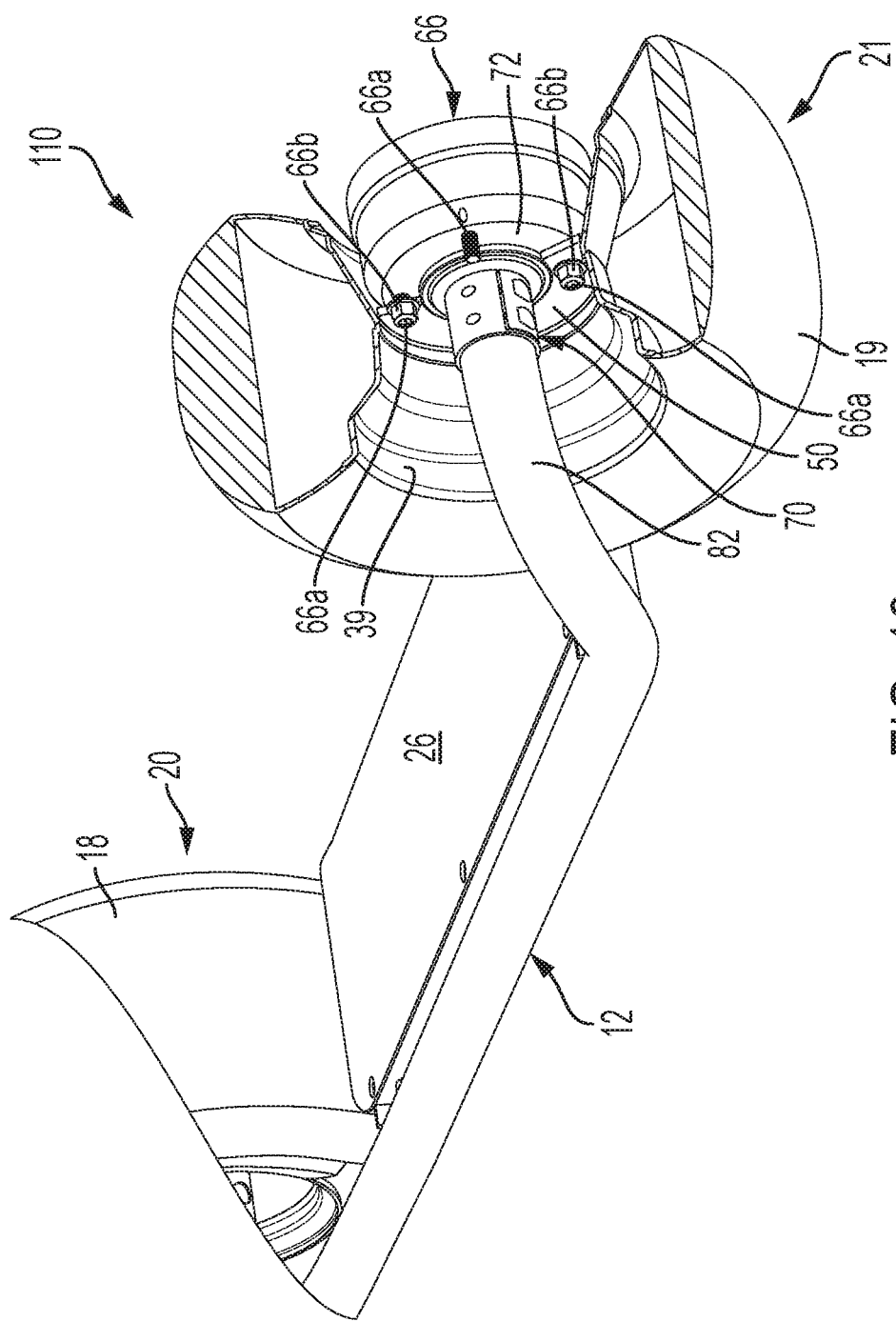
FIGS. 19 and 20 show fragmentary perspective views of a rear wheel assembly of the vehicle of FIG. 17.
Figure 20:
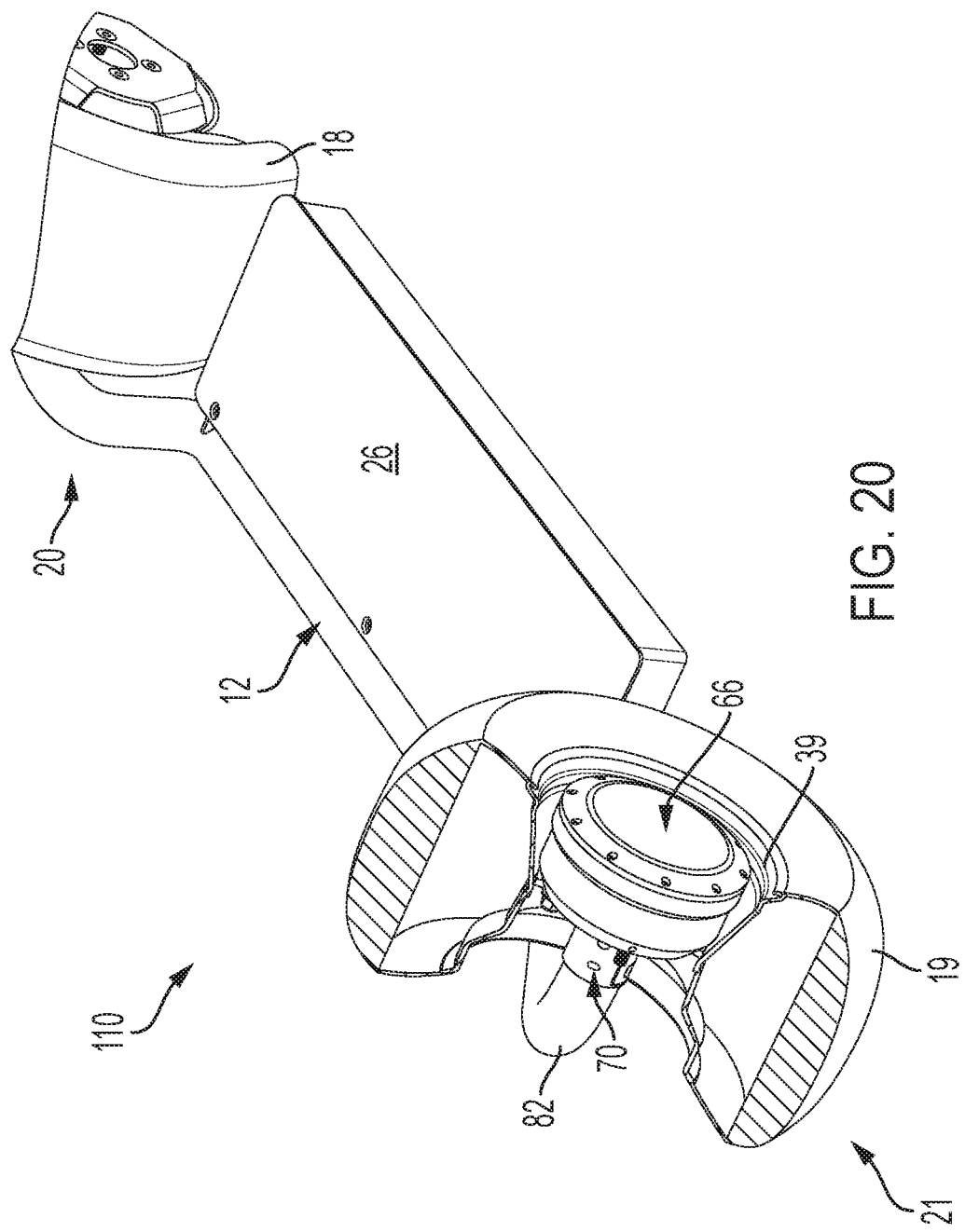
Figure 21:
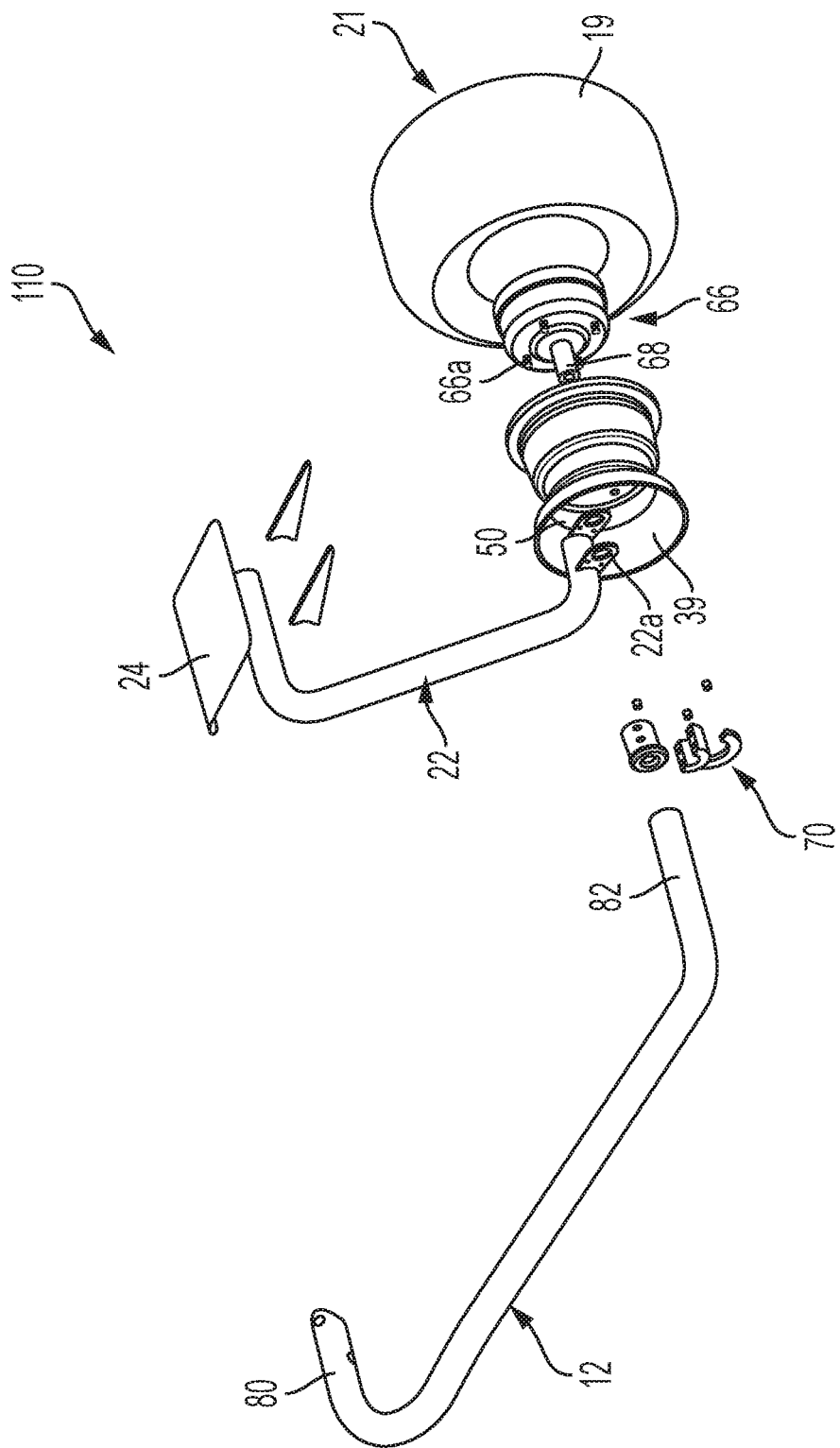
FIG. 21 shows a fragmentary exploded view of a rearward portion of the vehicle of FIG. 17.

FIGS. 17-21 illustrate another example embodiment of a vehicle 110 including one or more aspects of the present disclosure. The vehicle 110 is substantially similar to the vehicle 10 described above. In this embodiment, the frame 12 and the steering arm 16 and the seating arm 22 of the vehicle both couple to the wheel assemblies 20 and 21 along the same side of the wheel assemblies 20 and 21 (e.g., along the left side as shown in FIGS. 17 and 18, etc.). The opposite side of the wheel assemblies 20 and 21 (e.g., along the right side as shown in FIGS. 17 and 18, etc.), then, do not include any part of the frame 12 or the steering arm 16 extending therein or therefrom. In other words, in this embodiment, the frame 12 and the steering arm 16 of the vehicle 110 are generally disposed toward a single, same side of the vehicle 10. In addition, seating arm 22 may also be located along the same side of the wheel assemblies 20 and 21 as the frame 12 and the steering arm 16 (e.g., such that the seating arm 22 is configured to couple to the rear end 82 of the frame 12 via a mount 22a generally adjacent the rear wheel assembly 21, etc.) (see, FIG. 21).

With that said, the front end 80 of the frame 12 and the proximate end 34 of the steering arm 16 couple to the front wheel assembly 20 generally in the same manner as described above for the vehicle 10 (and as illustrated, for example, in FIGS. 1, 2A, 5, and 6). As such, it should be appreciated that the above description of this feature similarly applies to the vehicle 110.

In this embodiment, the rear end 82 of the frame 12 generally couples to the motor 66 at a location within a rear rim 39 of the rear wheel assembly 21. In particular, the motor 66 connects to a mount 50 of the rear rim 29 via bolts 66a of the motor 66 extending through corresponding openings of the mount 50 (whereby nuts 66b secure the motor 66 to the mount 50 of the rear rim 29). A clamp 70 then fixedly couples axle 68 associated with the motor 66 to the rear end 82 of the frame 12 (where the clamp 70 may also be used to couple the mount 22a of the seating arm 22 to the frame 12). In this position, the frame 12 is generally supported by the rear wheel assembly 21, and the rear tire 19 is rotatable by the motor 66 relative to the frame 12 (for causing desired movement of the vehicle 120). In particular, operation of the motor 66 rotates a hub 72 of the motor 66 relative to the axle 68 (and, thus, relative to the rear end 82 of the frame 12 as well to which the axle 68 is fixedly coupled by the clamp 70), whereby the hub 72 causes rotation of the rear rim 39 and rear tire 19 (of the rear wheel assembly 21).

In view of the above, vehicles of the present disclosure are configured for self-balancing when in an upright, operating position (e.g., without use of a separate stand, extra wheels, or other structure coupled to the vehicle, etc.). For instance, in various embodiments, the vehicles include at least one tire supporting a frame, where the at least one tire (e.g., when inflated, when in an operating configuration (e.g., for tires that may not require inflation, etc.), etc.) is configured to facilitate self-balancing of the vehicle (e.g., the at least one tire has a width of about three inches to help facilitate such self-balancing, the at least one tire has a width of about four inches to facilitate such self-balancing, the at least one tire has a width of about five inches to facilitate such self-balancing, the at least one tire has a flat tread section to help facilitate such self-balancing, etc.).

In addition, the vehicles of the present disclosure are also constructed to balance, distribute, etc. weight generally uniformly around the vehicles. For instance, frames of the vehicles are generally positioned so as to balance locations of vehicle batteries (or other power sources), and vice versa. In particular, in some embodiments, frames of the vehicles may be disposed generally along left sides of the vehicles and batteries of the vehicles may then be located within housings of the vehicles toward right sides of the vehicles to thereby balance weights of the frames and the batteries laterally across the vehicles. Thus, such balancing may help inhibit the vehicles from inadvertently tipping over in lateral, sideways directions of the vehicles (also assisting in the self-balancing features of the vehicles). In connection therewith, it should be appreciated that such balancing may be provided across the vehicles independent of the lengths of the vehicles. What's more, it should also be appreciated that such balancing may be applied independent of the number of tires included in the vehicles. For instance, a vehicle may have a single tire whereby such balancing may further be used to inhibit the vehicles from tipping over in both a lateral, sideways direction of the tire as well as in a forward/rearward direction of the tire.

Further, vehicles of the present disclosure provide a generally lowered center of gravity as compared to traditional scooters. For instance, in various exemplary embodiments, frames, housings, batteries, motors, etc. of the vehicles are all positioned below upper surfaces of tires of the vehicles. As such, a center of gravity of the vehicles may be provided between a horizontal plane extending tangent to an upper most point of a wheel and a ground plane extending parallel thereto (when the wheel is positioned on the ground). In some embodiments, about 90% or more of a weight of the vehicle may be disposed between these planes (e.g., about 90%, about 95%, about 98%, etc.). And, in some embodiments, a center of gravity of the vehicles may even be provided between a horizontal plane extending through a centerline of the front and rear hubs and a ground plane extending parallel thereto. In some embodiments, about 90% or more of a weight of the vehicle may be disposed between these planes (e.g., about 90%, about 95%, about 98%, etc.).

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A two-wheeled personal transport vehicle, the two-wheeled personal transport vehicle comprising:
   a frame;
   a front wheel coupled to the frame, the front wheel including a generally flattened portion extending around a perimeter of the front wheel;
   a rear wheel coupled to the frame in general alignment with the front wheel, the rear wheel including a generally flattened portion extending around a perimeter of the rear wheel; and
   a steering assembly coupled to the front wheel and configured to control movement of the front wheel for steering the personal transport vehicle;
   wherein the personal transport vehicle is self-balancing on the generally flattened portions of the front and rear wheels without use of a stand.

2. The two-wheeled personal transport vehicle of claim 1, further comprising a seat attached to the frame of the vehicle.

3. The two-wheeled personal transport vehicle of claim 1, wherein the rear wheel further comprises a motor.

4. The two-wheeled personal transport vehicle of claim 3, further comprising a power system electrically coupled to the motor.

5. The two-wheeled personal transport vehicle of claim 4, wherein the power system is confined within the frame.

6. The two-wheeled personal transport vehicle of claim 4, further comprising a charging unit electrically coupled to the power system and configured to charge the power system.

7. The two-wheeled personal transport vehicle of claim 1, further comprising a brake system affixed to the front wheel, the brake system including:

a brake disc;
a brake caliper; and
a brake pad.

8. A personal transport vehicle, comprising:
a frame;
a steering arm coupled to the frame;
a seating arm coupled to the frame;
a front wheel; and
a rear wheel;
wherein a center of gravity of the vehicle is substantially below a straight line connecting a centerline of the front wheel with a centerline of the rear wheel; and
wherein, in a folded configuration, the steering arm and the seating arm are positioned below a height of at least one of the front and rear wheels.

9. The personal transport vehicle of claim 8, further comprising a luggage rack coupled to a luggage arm.

10. The personal transport vehicle of claim 9, wherein the luggage arm, the steering arm and the seating arm are coupled to the front wheel.

11. The personal transport vehicle of claim 8, wherein the front wheel comprises a rim with a first side having a first inner diameter and a second side opposite the first side having a second inner diameter, wherein the first inner diameter is greater than the second inner diameter.

12. A personal transport vehicle, comprising:
a frame;
a front wheel coupled to the frame; and
a rear wheel coupled to the frame;
wherein the front wheel comprises a rim and a tire seated on the rim, wherein an outer perimeter of a first side of the rim has a first inner diameter and an outer perimeter of a second side of the rim opposite the first side has a second inner diameter, and wherein the first inner diameter is greater than the second inner diameter.

13. The personal transport vehicle of claim 12, wherein a center of gravity of the vehicle is substantially below a straight line connecting a centerline of the front wheel with a centerline of the rear wheel.

14. The personal transport vehicle of claim 12, wherein in a folded configuration, a steering arm and a seating arm are positioned below a height of at least one of the front and rear wheels.

15. The personal transport vehicle of claim 12, wherein the tire of the front wheel includes a generally flattened portion extending around a perimeter of the tire of the front wheel, and wherein a tire of the rear wheel includes a generally flattened portion extending around a perimeter of the tire of the rear wheel; and
wherein the personal transport vehicle is self-balancing on the generally flattened portions of the tires of the front and rear wheels without use of a stand.

* * * * *